United States Patent
Psaras et al.

(10) Patent No.: US 10,864,499 B2
(45) Date of Patent: Dec. 15, 2020

(54) HIGH POROSITY CERIUM AND ZIRCONIUM CONTAINING OXIDE

(71) Applicant: NEO PERFORMANCE MATERIALS (SINGAPORE), PTE. LTD., Singapore (SG)

(72) Inventors: Dmitrios Psaras, Bound Brook, NJ (US); Szu Hwee Ng, Singapore (SG); Happy, Singapore (SG); Shaun Pei Xiong Tio, Singapore (SG)

(73) Assignee: NEO PERFORMANCE MATERIALS (SINGAPORE), PTE. LTD., Singapore (SG)

( * ) Notice: Subject to any disclaimer, the term of this patent is extended or adjusted under 35 U.S.C. 154(b) by 399 days.

(21) Appl. No.: 15/509,144

(22) PCT Filed: Sep. 4, 2015

(86) PCT No.: PCT/US2015/048546
§ 371 (c)(1),
(2) Date: Mar. 6, 2017

(87) PCT Pub. No.: WO2016/037059
PCT Pub. Date: Mar. 10, 2016

(65) Prior Publication Data
US 2017/0274355 A1    Sep. 28, 2017

Related U.S. Application Data

(60) Provisional application No. 62/046,491, filed on Sep. 5, 2014.

(51) Int. Cl.
*B01J 23/00* (2006.01)
*B01J 35/00* (2006.01)
(Continued)

(52) U.S. Cl.
CPC .......... *B01J 23/002* (2013.01); *B01D 53/945* (2013.01); *B01J 23/10* (2013.01); *B01J 23/63* (2013.01);
(Continued)

(58) Field of Classification Search
CPC . B01J 23/002; B01J 23/10; B01J 23/63; B01J 23/00; B01J 35/002; B01J 35/1014;
(Continued)

(56) References Cited

U.S. PATENT DOCUMENTS

| | | | |
|---|---|---|---|
| 5,908,800 | A | 6/1999 | Bonneau et al. |
| 6,605,565 | B1 | 8/2003 | Zhang et al. |

(Continued)

FOREIGN PATENT DOCUMENTS

| | | |
|---|---|---|
| CN | 102247826 | 11/2011 |
| CN | 101797499 | 1/2012 |

(Continued)

OTHER PUBLICATIONS

Third Party Observation for International (PCT) Patent Application No. PCT/US2015/048546, dated Dec. 21, 2016 6 pages.

(Continued)

*Primary Examiner* — Smita S Patel
(74) *Attorney, Agent, or Firm* — Sheridan Ross P.C.

(57) ABSTRACT

This disclosure generally relates to an oxide composition basically composed of cerium and zirconium that has exceptional and stable porosity, surface area and lattice oxygen mobility. The oxide composition can contain one or more other rare earth oxides other than cerium oxide. For example, some compositions can contain one or more of lanthanum oxide, yttrium oxide and neodymium oxide. The oxide composition can be useful as a catalyst, catalyst support, sensor applications and combinations thereof.

30 Claims, 2 Drawing Sheets

Figure 1:
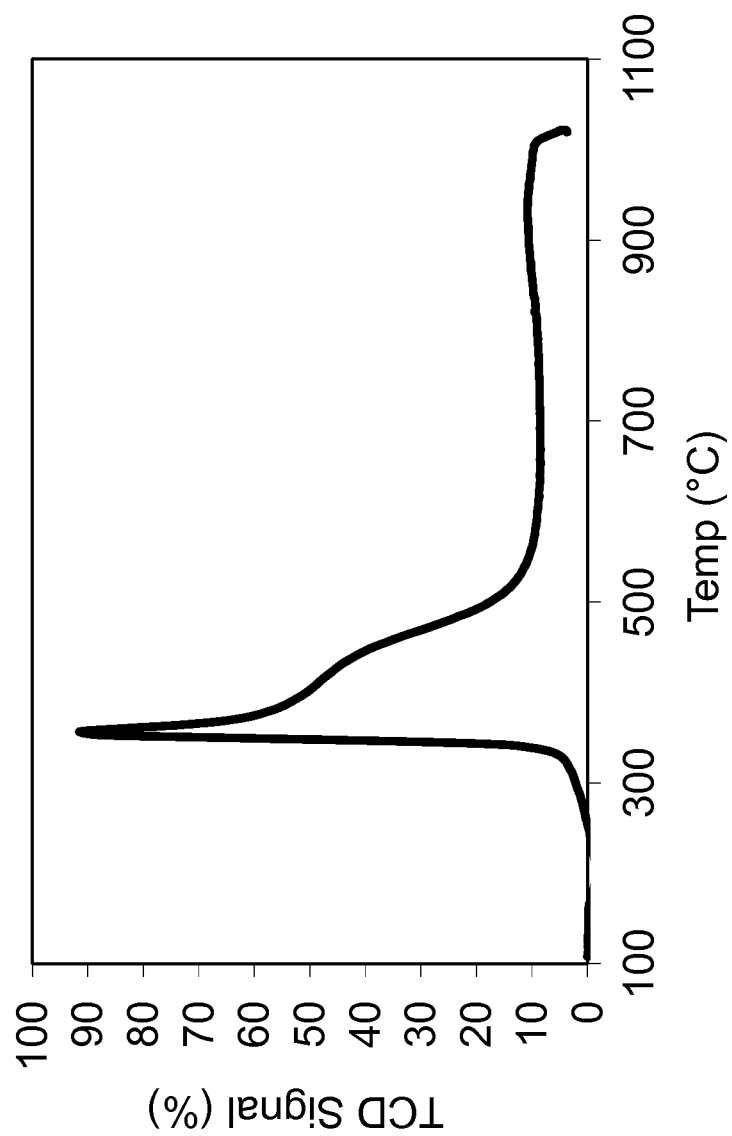

(51) Int. Cl.
| | | |
|---|---|---|
| B01J 23/10 | (2006.01) | |
| B01J 35/10 | (2006.01) | |
| B01J 37/08 | (2006.01) | |
| C01G 25/02 | (2006.01) | |
| B01J 23/63 | (2006.01) | |
| B01J 37/03 | (2006.01) | |
| B01J 37/06 | (2006.01) | |
| B01D 53/94 | (2006.01) | |
| C01F 17/206 | (2020.01) | |

(52) U.S. Cl.
CPC ............ *B01J 35/002* (2013.01); *B01J 35/10* (2013.01); *B01J 35/108* (2013.01); *B01J 35/1009* (2013.01); *B01J 35/1014* (2013.01); *B01J 35/1042* (2013.01); *B01J 35/1047* (2013.01); *B01J 37/031* (2013.01); *B01J 37/06* (2013.01); *B01J 37/08* (2013.01); *B01J 37/088* (2013.01); *C01F 17/206* (2020.01); *C01G 25/02* (2013.01); *B01J 35/1061* (2013.01); *B01J 35/1066* (2013.01); *B01J 35/1076* (2013.01); *B01J 35/1095* (2013.01); *B01J 2523/00* (2013.01); *B01J 2523/36* (2013.01); *B01J 2523/3712* (2013.01); *B01J 2523/48* (2013.01); *C01P 2004/82* (2013.01); *C01P 2006/12* (2013.01); *C01P 2006/13* (2013.01); *C01P 2006/14* (2013.01)

(58) Field of Classification Search
CPC .... B01J 35/10; B01J 35/1009; B01J 35/1042; B01J 35/1047; B01J 35/1076; B01J 35/1061; B01J 35/1066; B01J 35/1095; B01J 37/088; B01J 37/06; B01J 37/08; B01J 37/031; C01P 2004/82; C01P 2006/12; C01P 2006/13

See application file for complete search history.

(56) References Cited

U.S. PATENT DOCUMENTS

| | | | |
|---|---|---|---|
| 7,700,059 B2 | 4/2010 | Myeong et al. | |
| 7,964,527 B2 | 6/2011 | Larcher et al. | |
| 2009/0023581 A1* | 1/2009 | Di Monte | B01J 23/10 502/263 |
| 2009/0274599 A1* | 11/2009 | Larcher | B01J 35/1014 423/213.2 |
| 2011/0206583 A1* | 8/2011 | Larcher | B01D 53/945 423/213.2 |
| 2013/0108530 A1 | 5/2013 | Chang et al. | |
| 2013/0336864 A1 | 12/2013 | Zheng et al. | |
| 2014/0072492 A1 | 3/2014 | Ifrah et al. | |
| 2014/0140910 A1 | 5/2014 | La Jarrie et al. | |

FOREIGN PATENT DOCUMENTS

| | | |
|---|---|---|
| CN | 102527403 | 11/2013 |
| JP | 2012-180271 | 9/2012 |
| JP | 2012-533499 | 12/2012 |
| WO | WO 01/08797 | 2/2001 |

OTHER PUBLICATIONS

Comments on Thrid Party Observation for International (PCT) Patent Application No. PCt/US2015/048546, dated Feb. 24, 2017 2 pages.
Wang et al. "Synthesis of La modified ceria-zirconia solid solution by advanced supercritical ethanol drying technology and its application in Pd-only three-way catalyst," Applied Catalysis B: Environmental, 2010, vol. 100, pp. 516-528.
International Search Report and Written Opinion for International (PCT) Patent Application No. PCT/US2015/048546, dated Dec. 4, 2015, 10 pages.
International Preliminary Report on Patentability for International (PCT) Patent Application No. PCT/US2015/048546, dated Mar. 16, 2017, 10 pages.
Zhu et al., "pd/ce02-ti02 catalyst for CO oxidation at low temperature: a TPR study with H2 and CO as reducing agents," Journal of Catalysis, 2004, vol. 225, pp. 267-277, retrieved from http://www.researchgate.net/profile/Wenjuan_Shan/publication/223290037_pdCeO2TiO2_catalyst_for_CO_oxidation_at_low_temperature_a_TPR_study_with_H2_and_CO_as_reducing_agents/links/02373521aa86ee2b17000000.pdf>, 11 pages.
Official Action for European Patent Application No. 15837678.0, dated May 29, 2018 4 pages.
Yunzhao et al. "Significant Improvement of Thermal Stability for CeZrPrNd Oxides Simply by Supercritical CO2 Drying," PLOS One, Feb. 2014, vol. 9, No. 2, e88236, 7 pages.
Official Action with English Translation for Brazil Patent Application No. BR112017004418-8, dated Sep. 10, 2019 5 pages.
English Translation of Official Action for China Patent Application No. 201580060324.7, dated May 7, 2019 6 pages.
Extended Search Report for European Patent Application No. 15837678.0, dated Oct. 4, 2018 16 pages.
Official Action with English Summary for Japan Patent Application No. 2017-513022, dated Jul. 23, 2019 8 pages.

* cited by examiner

HIGH POROSITY CERIUM AND ZIRCONIUM CONTAINING OXIDE

CROSS REFERENCE TO RELATED APPLICATIONS

This application is a national stage application under 35 U.S.C. 371 and claims the benefit of PCT Application No. PCT/US2015/048546 having an international filing date of 4 Sep. 2015, which designated the United States, which PCT application claimed the benefit of U.S. Provisional Patent Application No. 62/046,491 filed 5 Sep. 2014, the disclosure of each of which are incorporated herein by reference in their entireties.

BACKGROUND

By definition, a catalyst selectively changes the rate by which a chemical reaction approaches equilibrium but it does not change this equilibrium. Catalysts are routinely used to increase the efficiencies by which raw material is utilized to manufacture new products as well as to enhance the rates of materials destruction, as is the case of pollution control. Basically, a catalyst is characterized by its activity, selectivity and durability. In order for a catalyst to maintain its high activity and selectivity, it is desirable for the active sites to be highly dispersed and resist active site sintering. In order for this to be achieved, the active materials are usually dispersed and/or anchored on substrate inorganic surfaces that maintain constant their integrity even under severe use and aging conditions. Furthermore, these active site support surfaces also participate or enhance certain facets of the desired reaction. Hence, these support surfaces are deemed functionally active support surfaces in that they can be promoters. Whereas, the primary active materials directly participate in the reaction, these promoters modify and improve the performance of the active materials. The characteristics of these supports and/or promoters play a major role in the effectiveness of a catalyst. As mentioned earlier, they do not only provide a stable surface for the dispersion of the active component sites, but their stability helps to maintain the dispersion and enhance or modify the activity of these active sites. In addition, the porosity of these supports plays a major role in the enhancement or hindrance of the mass transfer of reactants to and away from the active sites. Therefore, they influence the activity and selectivity of the said catalyst. It is the objective of this invention to describe such a functional support with enhanced surface area, durability and porosity characteristics.

Cerium oxide has long been recognized as automotive exhaust catalysis and as an effective catalyst for the water-gas shift reaction:

$$CO + H_2O \rightarrow CO_2 + H_2O \quad (1)$$

In addition, it is an effective material component in gas sensors, electrodes for solid oxide fuel cells, oxygen pumps and amperometric oxygen monitors. In all these applications, the redox characteristic of the cerium plays a major role:

$$2CeO_2 \leftrightarrow Ce_2O_3 + \tfrac{1}{2}O_2 \quad (2)$$

Although movement of oxygen or oxygen vacancy on the surface of the $CeO_2$ particle is relatively facile, it is not so for bulk oxygen. As a result, bulk oxygen participation in these reactions is rather limited. Introduction of zirconium into the cerium (IV) oxide lattice or cerium into the zirconium oxide lattice enhances and facilitates oxygen mobility. This fact has been readily adapted by the automotive pollution control catalyst industry where cerium and zirconium oxide ($CeO_2$—$ZrO_2$) containing materials are ubiquitous in use as washcoat components. Cerium and zirconium oxide containing materials have been developed where there is very high accessibility (low mass transfer resistance) to the surface and bulk oxygen of the system under steady state conditions where the time allowed for the mass transfer is relatively long. However, in situations where the molecular composition of streams vary rapidly, and the reaction rate is required to be rather high, these systems are deficient. That is, although the total oxygen capacity and availability is high, the rate at which this oxygen is transferred to and from the active centers is rather low (mass transfer limited).

Cerium and zirconium oxide ($CeO_2$—$ZrO_2$) based materials have also been used in catalytic applications as supports to disperse active metal catalysts so as to enhance the activity of the catalyst resulting in high turn-over numbers. To this, the support plays a major role in maintaining the active metal catalyst's high dispersion state even at severe operating conditions such as high temperatures and hydrothermal environments. A support that fails to maintain its structural integrity under severe conditions may result in the occlusion or sintering of the active catalyst metal sites which results in diminished activity of the catalyst on a per molecule basis. Since many of these catalysts utilize expensive precious metals such as platinum, palladium and/or rhodium, loss of catalyst metal activity directly impacts the cost of such catalysts requiring the use of increased precious metal loadings in order to maintain the desired catalyst activity. Parallel to this, the use of a structurally stable support allows for reduced precious metal use whilst maintaining or improving catalyst activity.

Beyond the above mentioned requirement for maintenance of a stable surface of the support it is also required that it also possesses as high a surface area as possible for the dispersion of the active metals. That is to say, that not only the structural integrity of the support needs to be maintained, but also the high surface area. By providing such high and stable surface area, the metal's activity as well as the active support's functionality is maintained.

Regardless of the catalyst site activity, facile molecular transport of reactants to the active site and transport of reaction products away from the active site making it available for further reaction is of great importance. In situations where catalyst selectivity is of no consideration, a wide and open pore structure of the support is desirable. In situations where selectivity of the reacting molecules or products is desired, an engineered porosity allowing only the desired reactants to reach the active site and only the desired products allowed to leave the active site, is needed. For example, this type of function is well known and utilized with zeolitic materials. Therefore, materials with a particular pore structure, is beneficial depending on the types of desired reactions.

A variety of synthesis methods for the production of the cerium and zirconium oxide ($CeO_2$—$ZrO_2$) based materials have been reported. Amongst them are coprecipitation, hydrothermal, microemulsion, sol-gel, solution combustion, electrochemical, solid-state reaction, mechano-chemical, chemical vapor deposition and sputtering methods to name a few. They are all reported to provide specific benefits depending on their application of use. For example, the coprecipitation method typically produces nano-crystalline (100 nm or less) cerium and zirconium oxide based materials with surface areas as high as 120 $m^2/g$ and pore volumes of about 0.73 $cm^3/g$. Some cerium and zirconium based materials with additional rare earth oxides other than cerium oxide have been produced, but they have limited surface area stability.

It is, therefore, the objective of this work to describe cerium and zirconium oxide ($CeO_2$—$ZrO_2$) based materials that fulfill the above required characteristics. That is, a catalyst/catalyst support that has a high surface area, a stable surface under air and hydrothermal and redox conditions, with stable crystallographic characteristics under severe aging conditions, high and stable porosity with high pore volume, with selective porosity, with high redox activity at lower temperatures and with low mass transfer resistance and high dynamic oxygen storage and release characteristics.

SUMMARY

This disclosure relates generally to catalyst/catalyst supports comprising cerium and zirconium as major components that possess high surface areas that have stable surfaces when subjected to severe aging conditions such as under high temperature air, hydrothermal and redox conditions. They also possess stable crystallographic characteristics under severe aging conditions, high and stable porosity with high pore volume, with selective porosity, with high redox activity at lower temperatures and with low mass transfer resistance and high dynamic oxygen storage and release characteristics.

It has now been found that when specific synthesis conditions comprising carefully selective temperature and pressure conditions during the dehydration of a water containing hydroxide comprising cerium and zirconium as the major components, oxides result that have the catalyst/catalyst support desired characteristics. That is, they possess high surface areas that have stable surfaces when subjected to severe aging conditions such as under high temperature air, hydrothermal and redox conditions. They also possess stable crystallographic characteristics under severe aging conditions, high and stable porosities with high pore volumes, with selective porosities, with high redox activities at lower temperatures and with low mass transfer resistance and high dynamic oxygen storage and release characteristics.

In accordance with some embodiments a composition can include zirconium oxide and cerium oxide. In some embodiments, the composition can contain one or more other rare earth oxides other than cerium oxide. In some embodiments, the composition can contain one or more other oxides other than cerium oxide and yttrium oxide.

In accordance with some embodiments the composition can have a total pore volume comprising one or more of, selected from the group consisting of and/or selected from the group consisting essentially of about 0.65 cc/g or more, about 0.71 cc/g or more, about 0.85 cc/g or more, about 0.99 cc/g or more, about 1.00 cc/g or more, about 1.07 cc/g or more, about 1.11 cc/g or more, about 1.17 cc/g or more, about 1.30 cc/g or more, about 1.33 cc/g or more, about 1.40 cc/g or more, about 1.43 cc/g or more, about 1.46 cc/g or more, about 1.58 cc/g or more, about 1.67 cc/g or more, about 1.96 cc/g or more, about 2.00 cc/g or more, about 2.20 cc/g or more, about 2.33 cc/g or more, about 2.60 cc/g or more, about 3.00 cc/g or more, and about 3.23 cc/g or more. In some embodiments, the composition can have a total pore volume comprising one or more of, selected from the group consisting of and/or selected from the group consisting essentially of about 0.65 cc/g or more, about 0.71 cc/g or more, about 0.85 cc/g or more, about 0.99 cc/g or more, about 1.00 cc/g or more, about 1.07 cc/g or more, about 1.11 cc/g or more, about 1.17 cc/g or more, about 1.30 cc/g or more, about 1.33 cc/g or more, about 1.40 cc/g or more, about 1.43 cc/g or more, about 1.46 cc/g or more, about 1.58 cc/g or more, about 1.67 cc/g or more, about 1.96 cc/g or more, about 2.00 cc/g or more, about 2.20 cc/g or more, about 2.33 cc/g or more, about 2.60 cc/g or more, about 3.00 cc/g or more, about 3.23 cc/g or more, and combinations thereof. Typically, the composition can have a total pore volume from about 0.7 to about 3.5 cc/g, more typically form about 0.65 to about 3.20 cc/g.

In accordance with some embodiments the composition can have a hydrogen thermal program reduction uptake after calcination at 1000 degrees Celsius for 10 hours comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1000 µmole/g or more, about 1006 µmole/g or more, about 1022 µmole/g or more, or about 1163 µmole/g or more. In some embodiments, the composition can have a hydrogen thermal program reduction uptake after calcination at 1000 degrees Celsius for 10 hours comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1000 µmole/g or more, about 1006 µmole/g or more, about 1022 µmole/g or more, about 1163 µmole/g or more, and combinations thereof. Typically, the composition can have a hydrogen thermal program reduction uptake after about 1000 degrees Celsius calcination for 10 hours from about 200 to about 1,500 µmole/g, more typically from about 250 to about 1,200 µmole/g.

In accordance with some embodiments the composition can have a hydrogen thermal program reduction uptake after about 1000 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, and about 0.99 molar ratio of $H_2$ consumption/$CeO_2$ or more. In some embodiments, the composition can have a hydrogen thermal program reduction uptake after about 1000 degrees calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, about 0.99 molar ratio of $H_2$ consumption/$CeO_2$ or more, and combinations thereof. In some embodiments, the composition can have a hydrogen thermal program reduction uptake after about 1000 degrees Celsius calcination for 10 hours from about 0.5 to about 1.1 molar ratio of $H_2$ consumption/$CeO_2$. In some embodiments, the composition can have a hydrogen thermal program reduction uptake after 1000 degrees Celsius calcination for 10 hours from about 0.54 to about 0.99 molar ratio of $H_2$ consumption/$CeO_2$.

In accordance with some embodiments the composition can have a hydrogen thermal program reduction uptake after about 1000 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, and about 0.99 molar ratio of $H_2$ consumption/$CeO_2$ or more. In some embodiments, the composition can have a hydrogen thermal program reduction uptake after about 1000 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, about 0.99 molar ratio of $H_2$ consumption/$CeO_2$ or more, and combinations thereof.

In accordance with some embodiments the composition can have a hydrogen thermal program reduction uptake after calcination at 1100 degrees Celsius for 10 hours comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1100 µmole/g or more, about 1006 µmole/g or more, about 1022 µmole/g or more, or about 1163 µmole/g or more. In some embodiments, the composition can have a hydrogen thermal program reduction uptake after calcination at 1100 degrees Celsius for 10 hours comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1100 µmole/g or more, about 1006 µmole/g or more, about 1022 µmole/g or more, about 1163 µmole/g or more, and combinations thereof. Typically, the composition can have a hydrogen thermal program reduction uptake after about 1100 degrees Celsius calcination for 10 hours from about 200 to about 1,500 µmole/g, more typically from about 250 to about 1,200 µmole/g.

In accordance with some embodiments the composition can have a hydrogen thermal program reduction uptake after about 1100 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, and about 0.99 molar ratio of $H_2$ consumption/$CeO_2$ or more. In some embodiments, the composition can have a hydrogen thermal program reduction uptake after about 1100 degrees calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, about 0.99 molar ratio of $H_2$ consumption/$CeO_2$ or more, and combinations thereof. In some embodiments, the composition can have a hydrogen thermal program reduction uptake after about 1100 degrees Celsius calcination for 10 hours from about 0.5 to about 1.1 molar ratio of $H_2$ consumption/$CeO_2$. In some embodiments, the composition can have a hydrogen thermal program reduction uptake after 1100 degrees Celsius calcination for 10 hours from about 0.54 to about 0.99 molar ratio of $H_2$ consumption/$CeO_2$.

In accordance with some embodiments the composition can have a hydrogen thermal program reduction uptake after about 1100 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, and about 0.99 molar ratio of $H_2$ consumption/$CeO_2$ or more. In some embodiments, the composition can have a hydrogen thermal program reduction uptake after about 1100 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, about 0.99 molar ratio of $H_2$ consumption/$CeO_2$ or more, and combinations thereof.

In accordance with some embodiments the composition can have a hydrogen thermal program reduction uptake after calcination at 1200 degrees Celsius for 10 hours comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1200 µmole/g or more, about 1006 µmole/g or more, about 1022 µmole/g or more, or about 1163 µmole/g or more. In some embodiments, the composition can have a hydrogen thermal program reduction uptake after calcination at 1200 degrees Celsius for 10 hours comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1200 µmole/g or more, about 1006 µmole/g or more, about 1022 µmole/g or more, about 1163 µmole/g or more, and combinations thereof. Typically, the composition can have a hydrogen thermal program reduction uptake after about 1200 degrees Celsius calcination for 10 hours from about 200 to about 1,500 µmole/g, more typically from about 250 to about 1,200 µmole/g.

In accordance with some embodiments the composition can have a hydrogen thermal program reduction uptake after about 1200 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, and about 0.99 molar ratio of $H_2$ consumption/$CeO_2$ or more. In some embodiments, the composition can have a hydrogen thermal program reduction uptake after about 1200 degrees calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, about 0.99 molar ratio of $H_2$ consumption/$CeO_2$ or more, and combinations thereof. In some embodiments, the composition can have a hydrogen thermal program reduction uptake after about 1200 degrees Celsius calcination for 10 hours from about 0.5 to about 1.1 molar ratio of $H_2$ consumption/$CeO_2$. In some embodiments, the composition can have a hydrogen thermal program reduction uptake after 1200 degrees Celsius calcination for 10 hours from about 0.54 to about 0.99 molar ratio of $H_2$ consumption/$CeO_2$.

In accordance with some embodiments the composition can have a hydrogen thermal program reduction uptake after about 1200 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, and about 0.99 molar ratio of $H_2$ consumption/$CeO_2$ or more. In some embodiments, the composition can have a hydrogen thermal program reduction uptake after about 1200 degrees Celsius calcination for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, about 0.99 molar ratio of $H_2$ consumption/$CeO_2$ or more, and combinations thereof.

In accordance with some embodiments the composition can have one or more of a BET and apparent surface area comprising one or more of, selected from the group consisting of and/or selected from the group consisting essentially of about 1.9 $m^2/g$ or more after calcinations at 1200 degrees Celsius for a period of 10 hours or more in an oxidizing environment, about 2.4 $m^2/g$ or more after calcinations at 1200 degrees Celsius for a period of 10 hours or more in an oxidizing environment, about 2.9 $m^2/g$ or more after calcinations at 1200 degrees Celsius for a period of 10 hours or more in an oxidizing environment, about 3.6 $m^2/g$ or more after calcinations at 1200 degrees Celsius for a period of 10 hours or more in an oxidizing environment, about 3.9 $m^2/g$ or more after calcinations at 1200 degrees Celsius for a period of 10 hours or more in an oxidizing environment, about 4.0 $m^2/g$ or more after calcinations at 1200 degrees Celsius for a period of 10 hours or more in an oxidizing environment, about 4.1 $m^2/g$ or more after calcinations at 1200 degrees Celsius for a period of 10 hours or more in an oxidizing environment, about 4.5 $m^2/g$ or more after calcinations at 1200 degrees Celsius for a period of 10 hours or more in an oxidizing environment, about 4.6 $m^2/g$ or more after calcinations at 1200 degrees Celsius for a period of 10 hours or more in an oxidizing environment, about 5.3 $m^2/g$ or more after calcinations at 1200 degrees Celsius for a period of 10 hours or more in an oxidizing environment, about 24 $m^2/g$ or more after calcination at 1100 degrees Celsius for a period of 10 hours in an oxidizing environment, about 26 $m^2/g$ or more after calcination at 1100 degrees Celsius for a period of 10 hours in an oxidizing environment, about 27 $m^2/g$ or more after calcination at 1100 degrees Celsius for a period of 10 hours in an oxidizing environment, about 28 $m^2/g$ or more after calcination at 1100 degrees Celsius for a period of 10 hours in an oxidizing environment, about 29 $m^2/g$ or more after calcination at 1100 degrees Celsius for a period of 10 hours in an oxidizing environment, about 50 $m^2/g$ or more after calcination at 1000 degrees Celsius for a period of 10 hours in an oxidizing environment, about 53 $m^2/g$ or more after calcination at 1000 degrees Celsius for a period of 10 hours in an oxidizing environment, about 54 $m^2/g$ or more after calcination at 1000 degrees Celsius for a period of 10 hours in an oxidizing environment, about 55 $m^2/g$ or more after calcination at 1000 degrees Celsius for a period of 10 hours in an oxidizing environment, about 58 $m^2/g$ or more after calcination at 1000 degrees Celsius for a period of 10 hours in an oxidizing environment, about 60 $m^2/g$ or more after calcination at 1000 degrees Celsius for a period of 10 hours in an oxidizing environment, and about 63 $m^2/g$ or more after calcination at 1000 degrees Celsius for a period of 10 hours in an oxidizing environment. In some embodiments, the composition can have one or more of a BET and apparent surface area comprising one or more of, selected from the group consisting of and/or selected from the group consisting essentially of about 1.9 $m^2/g$ or more after calcinations at 1200 degrees Celsius for a period of 10 hours or more in an oxidizing environment, about 2.4 $m^2/g$ or more after calcinations at 1200 degrees Celsius for a period of 10 hours or more in an oxidizing environment, about 2.9 $m^2/g$ or more after calcinations at 1200 degrees Celsius for a period of 10 hours or more in an oxidizing environment, about 3.6 $m^2/g$ or more after calcinations at 1200 degrees Celsius for a period of 10 hours or more in an oxidizing environment, about 3.9 $m^2/g$ or more after calcinations at 1200 degrees Celsius for a period of 10 hours or more in an oxidizing environment, about 4.0 $m^2/g$ or more after calcinations at 1200 degrees Celsius for a period of 10 hours or more in an oxidizing environment, about 4.1 $m^2/g$ or more after calcinations at 1200 degrees Celsius for a period of 10 hours or more in an oxidizing environment, about 4.5 $m^2/g$ or more after calcinations at 1200 degrees Celsius for a period of 10 hours or more in an oxidizing environment, about 4.6 $m^2/g$ or more after calcinations at 1200 degrees Celsius for a period of 10 hours or more in an oxidizing environment, about 5.3 $m^2/g$ or more after calcinations at 1200 degrees Celsius for a period of 10 hours or more in an oxidizing environment, 24 $m^2/g$ or more after calcination at 1100 degrees Celsius for a period of 10 hours in an oxidizing environment, about 26 $m^2/g$ or more after calcination at 1100 degrees Celsius for a period of 10 hours in an oxidizing environment, about 27 $m^2/g$ or more after calcination at 1100 degrees Celsius for a period of 10 hours in an oxidizing environment, about 28 $m^2/g$ or more after calcination at 1100 degrees Celsius for a period of 10 hours in an oxidizing environment, about 29 $m^2/g$ or more after calcination at 1100 degrees Celsius for a period of 10 hours in an oxidizing environment, about 50 $m^2/g$ or more after calcination at 1000 degrees Celsius for a period of 10 hours in an oxidizing environment, about 53 m$^2$/g or more after calcination at 1000 degrees Celsius for a period of 10 hours in an oxidizing environment, about 54 m$^2$/g or more after calcination at 1000 degrees Celsius for a period of 10 hours in an oxidizing environment, about 55 m$^2$/g or more after calcination at 1000 degrees Celsius for a period of 10 hours in an oxidizing environment, about 58 m$^2$/g or more after calcination at 1000 degrees Celsius for a period of 10 hours in an oxidizing environment, about 60 m$^2$/g or more after calcination at 1000 degrees Celsius for a period of 10 hours in an oxidizing environment, about 63 m$^2$/g or more after calcination at 1000 degrees Celsius for a period of 10 hours in an oxidizing environment, and combinations thereof. In some embodiments, the composition can have one or more of a BET and apparent surface area from about 1.0 to about 6.0 m$^2$/g after calcinations at 1200 degrees Celsius for a period of 10 hours or more in an oxidizing environment. In some embodiments, the composition can have one or more of a BET and apparent surface area from about 1.9 to about 5.2 m$^2$/g after calcinations at 1200 degrees Celsius for a period of 10 hours or more in an oxidizing environment. In some embodiments, the composition can have one or more of a BET and apparent surface area from about 1.0 to about 6.0 m$^2$/g after calcinations at 1200 degrees Celsius for a period of 10 hours or more in an oxidizing environment. In some embodiments, the composition can have one or more of a BET and apparent surface area from about 1.9 to about 5.2 m$^2$/g after calcinations at 1200 degrees Celsius for a period of 10 hours or more in an oxidizing environment. In some embodiments, the composition can have one or more of a BET and apparent surface area from about 20 m$^2$/g to about 30 m$^2$/g after calcination at 1100 degrees Celsius for a period of 10 hours in an oxidizing environment. In some embodiments, the composition can have one or more of a BET and apparent surface area from about 24 m$^2$/g to about 29 m$^2$/g after calcination at 1100 degrees Celsius for a period of 10 hours in an oxidizing environment. In some embodiments, the composition can have one or more of a BET and apparent surface area from about 45 m$^2$/g to about 70 m$^2$/g after calcination at 1000 degrees Celsius for a period of 10 hours in an oxidizing environment. In some embodiments, the composition can have one or more of a BET and apparent surface area from about 50 m$^2$/g to about 65 m$^2$/g after calcination at 1000 degrees Celsius for a period of 10 hours in an oxidizing environment.

In some embodiments, the composition can have a total pore volume of 2.00 cc/g or more. In some embodiments, the composition can have a total pore volume of 1.30 cc/g or more. In some embodiments, the composition can have a total pore volume of 0.65 cc/g or more after calcination at 1000 degrees Celsius for a period of 10 hours in an oxidizing environment. In some embodiments, the composition can have a total pore volume of 1.00 cc/g or more after calcination at 1000 degrees Celsius for a period of 10 hours in an oxidizing environment. In some embodiments, the composition can have a total pore volume of 1.4 cc/g or more after calcination at 1000 degrees Celsius for a period of 10 hours in an oxidizing environment. In some embodiments, the composition can have a total pore volume of one of 2.00 cc/g or more or 1.30 cc/g or more and the one or more other rare earth oxides contained in the composition can be lanthanum oxide and one or both of yttrium oxide and neodymium oxide. In some embodiments, the composition can after calcination at 1000 degrees Celsius for a period of 10 hours in an oxidizing environment have a total pore volume of one of 0.65 cc/g or more, 1.00 cc/g or more, 1.4 cc/g or and the one or more other rare earth oxides can be lanthanum oxide and one or both of yttrium oxide and neodymium oxide. In some embodiments, the composition can have a total pore volume from about 0.6 to about 2.00 cc/g after calcination at 1000 degrees Celsius for a period of 10 hours in an oxidizing environment. In some embodiments, the composition can have a total pore volume from about 0.65 to about 2.00 cc/g after calcination at 1000 degrees Celsius for a period of 10 hours in an oxidizing environment. In some embodiments, the composition can have a total pore volume of one of from about 0.6 to about 2.00 cc/g and the one or more other rare earth oxides contained in the composition can be lanthanum oxide and one or both of yttrium oxide and neodymium oxide. In some embodiments, the composition can after calcination at 1000 degrees Celsius for a period of 10 hours in an oxidizing environment have a total pore volume from about 0.6 to about 2.00 cc/g and the one or more other rare earth oxides contained in composition can be lanthanum oxide and one or both of yttrium oxide and neodymium oxide. In some embodiments, the composition can have a total pore volume of one of from about 0.65 to about 2.00 cc/g and the one or more other rare earth oxides contained in the composition can be lanthanum oxide and one or both of yttrium oxide and neodymium oxide. In some embodiments, the composition can after calcination at 1000 degrees Celsius for a period of 10 hours in an oxidizing environment have a total pore volume from about 0.65 to about 2.00 cc/g and the one or more other rare earth oxides contained in composition can be lanthanum oxide and one or both of yttrium oxide and neodymium oxide. In some embodiments, the composition can have a total pore volume of 0.65 cc/g or more after calcination at 1100 degrees Celsius for a period of 10 hours in an oxidizing environment. In some embodiments, the composition can have a total pore volume of 1.00 cc/g or more after calcination at 1100 degrees Celsius for a period of 10 hours in an oxidizing environment. In some embodiments, the composition can have a total pore volume of 1.4 cc/g or more after calcination at 1100 degrees Celsius for a period of 10 hours in an oxidizing environment. In some embodiments, the composition can have a total pore volume of one of 2.00 cc/g or more or 1.30 cc/g or more and the one or more other rare earth oxides contained in the composition can be lanthanum oxide and one or both of yttrium oxide and neodymium oxide. In some embodiments, the composition can after calcination at 1100 degrees Celsius for a period of 10 hours in an oxidizing environment have a total pore volume of one of 0.65 cc/g or more, 1.00 cc/g or more, 1.4 cc/g or and the one or more other rare earth oxides can be lanthanum oxide and one or both of yttrium oxide and neodymium oxide. In some embodiments, the composition can have a total pore volume from about 0.6 to about 2.00 cc/g after calcination at 1100 degrees Celsius for a period of 10 hours in an oxidizing environment. In some embodiments, the composition can have a total pore volume from about 0.65 to about 2.00 cc/g after calcination at 1100 degrees Celsius for a period of 10 hours in an oxidizing environment. In some embodiments, the composition can have a total pore volume of one of from about 0.6 to about 2.00 cc/g and the one or more other rare earth oxides contained in the composition can be lanthanum oxide and one or both of yttrium oxide and neodymium oxide. In some embodiments, the composition can after calcination at 1100 degrees Celsius for a period of 10 hours in an oxidizing environment have a total pore volume from about 0.6 to about 2.00 cc/g and the one or more other rare earth oxides contained in composition can be lanthanum oxide and one or both of yttrium oxide and neodymium oxide. In some embodiments, the composition can have a total pore volume of one of from about 0.65 to about 2.00 cc/g and the one or more other rare earth oxides contained in the composition can be lanthanum oxide and one or both of yttrium oxide and neodymium oxide. In some embodiments, the composition can after calcination at 1100 degrees Celsius for a period of 10 hours in an oxidizing environment have a total pore volume from about 0.65 to about 2.00 cc/g and the one or more other rare earth oxides contained in composition can be lanthanum oxide and one or both of yttrium oxide and neodymium oxide. In some embodiments, the composition can have a total pore volume of 0.65 cc/g or more after calcination at 1200 degrees Celsius for a period of 10 hours in an oxidizing environment. In some embodiments, the composition can have a total pore volume of 1.00 cc/g or more after calcination at 1200 degrees Celsius for a period of 10 hours in an oxidizing environment. In some embodiments, the composition can have a total pore volume of 1.4 cc/g or more after calcination at 1200 degrees Celsius for a period of 10 hours in an oxidizing environment. In some embodiments, the composition can have a total pore volume of one of 2.00 cc/g or more or 1.30 cc/g or more and the one or more other rare earth oxides contained in the composition can be lanthanum oxide and one or both of yttrium oxide and neodymium oxide. In some embodiments, the composition can after calcination at 1200 degrees Celsius for a period of 10 hours in an oxidizing environment have a total pore volume of one of 0.65 cc/g or more, 1.00 cc/g or more, 1.4 cc/g or and the one or more other rare earth oxides can be lanthanum oxide and one or both of yttrium oxide and neodymium oxide. In some embodiments, the composition can have a total pore volume from about 0.6 to about 2.00 cc/g after calcination at 1200 degrees Celsius for a period of 10 hours in an oxidizing environment. In some embodiments, the composition can have a total pore volume from about 0.65 to about 2.00 cc/g after calcination at 1200 degrees Celsius for a period of 10 hours in an oxidizing environment. In some embodiments, the composition can have a total pore volume of one of from about 0.6 to about 2.00 cc/g and the one or more other rare earth oxides contained in the composition can be lanthanum oxide and one or both of yttrium oxide and neodymium oxide. In some embodiments, the composition can after calcination at 1200 degrees Celsius for a period of 10 hours in an oxidizing environment have a total pore volume from about 0.6 to about 2.00 cc/g and the one or more other rare earth oxides contained in composition can be lanthanum oxide and one or both of yttrium oxide and neodymium oxide. In some embodiments, the composition can have a total pore volume of one of from about 0.65 to about 2.00 cc/g and the one or more other rare earth oxides contained in the composition can be lanthanum oxide and one or both of yttrium oxide and neodymium oxide. In some embodiments, the composition can after calcination at 1200 degrees Celsius for a period of 10 hours in an oxidizing environment have a total pore volume from about 0.65 to about 2.00 cc/g and the one or more other rare earth oxides contained in composition can be lanthanum oxide and one or both of yttrium oxide and neodymium oxide.

In accordance with some embodiments, two or more of the following can be true for the composition: the composition can have a total pore volume comprising one or more of, selected from the group consisting of and/or selected from the group consisting essentially of about 0.65 cc/g or more, about 0.71 cc/g or more, about 0.85 cc/g or more, about 0.99 cc/g or more, about 1.00 cc/g or more, about 1.07 cc/g or more, about 1.11 cc/g or more, about 1.17 cc/g or more, about 1.30 cc/g or more, about 1.33 cc/g or more, about 1.40 cc/g or more, about 1.43 cc/g or more, about 1.46 cc/g or more, about 1.58 cc/g or more, about 1.67 cc/g or more, about 1.96 cc/g or more, about 2.00 cc/g or more, about 2.20 cc/g or more, about 2.33 cc/g or more, about 2.60 cc/g or more, about 3.00 cc/g or more, or about 3.23 cc/g or more and combinations thereof; the composition can have a hydrogen thermal program reduction uptake after calcination at 1000 degrees Celsius for 10 hours comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1000 µmole/g or more, about 1006 µmole/g or more, about 1022 µmole/g or more, or about 1163 µmole/g or more and combinations thereof; and the composition can have one or more of a BET and apparent surface area comprising one or more of, selected from the group consisting of and/or selected from the group consisting essentially of about 1.9 $m^2/g$ or more after calcinations at 1200 degrees Celsius for a period of 10 hours or more in an oxidizing environment, about 2.4 $m^2/g$ or more after calcinations at 1200 degrees Celsius for a period of 10 hours or more in an oxidizing environment, about 2.9 $m^2/g$ or more after calcinations at 1200 degrees Celsius for a period of 10 hours or more in an oxidizing environment, about 3.6 $m^2/g$ or more after calcinations at 1200 degrees Celsius for a period of 10 hours or more in an oxidizing environment, about 3.9 $m^2/g$ or more after calcinations at 1200 degrees Celsius for a period of 10 hours or more in an oxidizing environment, about 4.0 $m^2/g$ or more after calcinations at 1200 degrees Celsius for a period of 10 hours or more in an oxidizing environment, about 4.1 $m^2/g$ or more after calcinations at 1200 degrees Celsius for a period of 10 hours or more in an oxidizing environment, about 4.5 $m^2/g$ or more after calcinations at 1200 degrees Celsius for a period of 10 hours or more in an oxidizing environment, about 4.6 $m^2/g$ or more after calcinations at 1200 degrees Celsius for a period of 10 hours or more in an oxidizing environment, about 5.3 $m^2/g$ or more after calcinations at 1200 degrees Celsius for a period of 10 hours or more in an oxidizing environment, about 24 $m^2/g$ or more after calcination at 1100 degrees Celsius for a period of 10 hours in an oxidizing environment, about 26 $m^2/g$ or more after calcination at 1100 degrees Celsius for a period of 10 hours in an oxidizing environment, about 27 $m^2/g$ or more after calcination at 1100 degrees Celsius for a period of 10 hours in an oxidizing environment, about 28 $m^2/g$ or more after calcination at 1100 degrees Celsius for a period of 10 hours in an oxidizing environment, about 29 $m^2/g$ or more after calcination at 1100 degrees Celsius for a period of 10 hours in an oxidizing environment, about 50 $m^2/g$ or more after calcination at 1000 degrees Celsius for a period of 10 hours in an oxidizing environment, about 53 $m^2/g$ or more after calcination at 1000 degrees Celsius for a period of 10 hours in an oxidizing environment, about 54 $m^2/g$ or more after calcination at 1000 degrees Celsius for a period of 10 hours in an oxidizing environment, about 55 $m^2/g$ or more after calcination at 1000 degrees Celsius for a period of 10 hours in an oxidizing environment, about 58 $m^2/g$ or more after calcination at 1000 degrees Celsius for a period of 10 hours in an oxidizing environment, about 60 $m^2/g$ or more after calcination at 1000 degrees Celsius for a period of 10 hours in an oxidizing environment, or about 63 $m^2/g$ or more after calcination at 1000 degrees Celsius for a period of 10 hours in an oxidizing environment and combinations thereof.

In accordance with some embodiments, two or more of the following can be true for the composition: the composition can have a total pore volume comprising one or more of, selected from the group consisting of and/or selected from the group consisting essentially of about 0.65 cc/g or more, about 0.71 cc/g or more, about 0.85 cc/g or more, about 0.99 cc/g or more, about 1.00 cc/g or more, about 1.07 cc/g or more, about 1.11 cc/g or more, about 1.17 cc/g or more, about 1.30 cc/g or more, about 1.33 cc/g or more, about 1.40 cc/g or more, about 1.43 cc/g or more, about 1.46 cc/g or more, about 1.58 cc/g or more, about 1.67 cc/g or more, about 1.96 cc/g or more, about 2.00 cc/g or more, about 2.20 cc/g or more, about 2.33 cc/g or more, about 2.60 cc/g or more, about 3.00 cc/g more, or about 3.23 cc/g or more, and combinations thereof; the composition can have a hydrogen thermal program reduction molar ratio uptake after calcination at 1000 degrees Celsius (and/or 1100 and/or 1200 degrees Celsius) for 10 hours comprising one or more of, selected from the group consisting of and/or selected from the group consisting essentially of about 0.54 molar ratio of $H_2$ consumption/$CeO_2$ or more, about 0.55 molar ratio of $H_2$ consumption/$CeO_2$ or more, about 0.58 molar ratio of $H_2$ consumption/$CeO_2$ or more, about 0.59 molar ratio of $H_2$ consumption/$CeO_2$ or more, about 0.67 molar ratio of $H_2$ consumption/$CeO_2$ or more, about 0.99 molar ratio of $H_2$ consumption/$CeO_2$ or more, and combinations thereof; and the composition can have one or more of a BET and apparent surface area comprising one or more of selected from the group consisting of and/or selected from the group consisting essentially of about 1.9 $m^2/g$ or more after calcinations at 1200 degrees Celsius for a period of 10 hours or more in an oxidizing environment, about 2.4 $m^2/g$ or more after calcinations at 1200 degrees Celsius for a period of 10 hours or more in an oxidizing environment, about 2.9 $m^2/g$ or more after calcinations at 1200 degrees Celsius for a period of 10 hours or more in an oxidizing environment, about 3.6 $m^2/g$ or more after calcinations at 1200 degrees Celsius for a period of 10 hours or more in an oxidizing environment, about 3.9 $m^2/g$ or more after calcinations at 1200 degrees Celsius for a period of 10 hours or more in an oxidizing environment, about 4.0 $m^2/g$ or more after calcinations at 1200 degrees Celsius for a period of 10 hours or more in an oxidizing environment, about 4.1 $m^2/g$ or more after calcinations at 1200 degrees Celsius for a period of 10 hours or more in an oxidizing environment, about 4.5 $m^2/g$ or more after calcinations at 1200 degrees Celsius for a period of 10 hours or more in an oxidizing environment, about 4.6 $m^2/g$ or more after calcinations at 1200 degrees Celsius for a period of 10 hours or more in an oxidizing environment, about 5.3 $m^2/g$ or more after calcinations at 1200 degrees Celsius for a period of 10 hours or more in an oxidizing environment, about 24 $m^2/g$ or more after calcination at 1100 degrees Celsius for a period of 10 hours in an oxidizing environment, about 26 $m^2/g$ or more after calcination at 1100 degrees Celsius for a period of 10 hours in an oxidizing environment, about 27 $m^2/g$ or more after calcination at 1100 degrees Celsius for a period of 10 hours in an oxidizing environment, about 28 $m^2/g$ or more after calcination at 1100 degrees Celsius for a period of 10 hours in an oxidizing environment, about 29 $m^2/g$ or more after calcination at 1100 degrees Celsius for a period of 10 hours in an oxidizing environment, about 50 $m^2/g$ or more after calcination at 1000 degrees Celsius for a period of 10 hours in an oxidizing environment, about 53 $m^2/g$ or more after calcination at 1000 degrees Celsius for a period of 10 hours in an oxidizing environment, about 54 $m^2/g$ or more after calcination at 1000 degrees Celsius for a period of 10 hours in an oxidizing environment, about 55 $m^2/g$ or more after calcination at 1000 degrees Celsius for a period of 10 hours in an oxidizing environment, about 58 $m^2/g$ or more after calcination at 1000 degrees Celsius for a period of 10 hours in an oxidizing environment, about 60 $m^2/g$ or more after calcination at 1000 degrees Celsius for a period of 10 hours in an oxidizing environment, and about 63 $m^2/g$ or more after calcination at 1000 degrees Celsius for a period of 10 hours in an oxidizing environment, and combinations thereof.

In accordance with some embodiments, two or more of the following can be true for the composition: the composition can have a total pore volume comprising one or more of, selected from the group consisting of and/or selected from the group consisting essentially of from about 0.7 to about 3.5 cc/g and form about 0.65 to about 3.20 cc/g; the composition can have a hydrogen thermal program reduction uptake after calcination at 1000 degrees Celsius for 10 hours comprising one or more of, selected from the group consisting of and/or selected from the group consisting essentially of from about 0.5 to about 1.1 molar ratio of $H_2$ consumption/$CeO_2$ and from about 0.54 to about 0.99 molar ratio of $H_2$ consumption/$CeO_2$; and the composition can have one or more of a BET and apparent surface area comprising one or more of, selected from the group consisting of and/or selected from the group consisting essentially of from about 1.0 to about 6.0 $m^2/g$ after calcinations at 1200 degrees Celsius for a period of 10 hours or more in an oxidizing environment, from about 1.9 to about 5.2 $m^2/g$ after calcinations at 1200 degrees Celsius for a period of 10 hours or more in an oxidizing environment, from about 20 $m^2/g$ to about 30 $m^2/g$ after calcination at 1100 degrees Celsius for a period of 10 hours in an oxidizing environment, from about 24 $m^2/g$ to about 29 $m^2/g$ after calcination at 1100 degrees Celsius for a period of 10 hours in an oxidizing environment, from about 45 $m^2/g$ to about 70 $m^2/g$ after calcination at 1000 degrees Celsius for a period of 10 hours in an oxidizing environment, from about 50 $m^2/g$ to about 65 $m^2/g$ after calcination at 1000 degrees Celsius for a period of 10 hours in an oxidizing environment, and combinations thereof.

In accordance with some embodiments, two or more of the following can be true for the composition: the composition can have a total pore volume comprising one or more of, selected from the group consisting of and/or selected from the group consisting essentially of from about 0.7 to about 3.5 cc/g and form about 0.65 to about 3.20 cc/g; the composition can have a hydrogen thermal program reduction uptake after calcination at 1000 degrees Celsius for 10 hours comprising one or more of, selected from the group consisting of and/or selected from the group consisting essentially of from about 200 to about 1,500 μmole/g, more typically from about 250 to about 1,200 μmole/g; and the composition can have one or more of a BET and apparent surface area comprising one or more of, selected from the group consisting of and/or selected from the group consisting essentially of from about 1.0 to about 6.0 $m^2/g$ after calcinations at 1200 degrees Celsius for a period of 10 hours or more in an oxidizing environment, from about 1.9 to about 5.2 $m^2/g$ after calcinations at 1200 degrees Celsius for a period of 10 hours or more in an oxidizing environment, from about 20 $m^2/g$ to about 30 $m^2/g$ after calcination at 1100 degrees Celsius for a period of 10 hours in an oxidizing environment, from about 24 $m^2/g$ to about 29 $m^2/g$ after calcination at 1100 degrees Celsius for a period of 10 hours in an oxidizing environment, from about 45 m²/g to about 70 m²/g after calcination at 1000 degrees Celsius for a period of 10 hours in an oxidizing environment, from about 50 m²/g to about 65 m²/g after calcination at 1000 degrees Celsius for a period of 10 hours in an oxidizing environment, and combinations thereof.

In accordance with some embodiments, two or more of the following can be true for the composition: the composition can have a total pore volume comprising one or more of, selected from the group consisting of and/or selected from the group consisting essentially of about 0.65 cc/g or more, about 0.71 cc/g or more, about 0.85 cc/g or more, about 0.99 cc/g or more, about 1.00 cc/g or more, about 1.07 cc/g or more, about 1.11 cc/g or more, about 1.17 cc/g or more, about 1.30 cc/g or more, about 1.33 cc/g or more, about 1.40 cc/g or more, about 1.43 cc/g or more, about 1.46 cc/g or more, about 1.58 cc/g or more, about 1.67 cc/g or more, about 1.96 cc/g or more, about 2.00 cc/g or more, about 2.20 cc/g or more, about 2.33 cc/g or more, about 2.60 cc/g or more, about 3.00 cc/g and more, or about 3.23 cc/g or more; the composition can have a hydrogen thermal program reduction uptake comprising one or more of, selected from the group consisting of and/or selected from the group consisting essentially of about 250 µmole/g or more, about 287 µmole/g or more, about 600 µmole/g or more, about 654 µmole/g or more, about 900 µmole/g or more, about 954 µmole/g or more, about 966 µmole/g or more, about 967 µmole/g or more, about 1000 µmole/g or more, about 1006 µmole/g or more, about 1022 µmole/g and more, or about 1163 µmole/g or more; and the composition can have one or more of a BET and apparent surface area comprising one or more of, selected from the group consisting of and/or selected from the group consisting essentially of about 1.9 m²/g or more after calcinations at 1200 degrees Celsius for a period of 10 hours or more in an oxidizing environment, about 2.4 m²/g or more after calcinations at 1200 degrees Celsius for a period of 10 hours or more in an oxidizing environment, about 2.9 m²/g or more after calcinations at 1200 degrees Celsius for a period of 10 hours or more in an oxidizing environment, about 3.6 m²/g or more after calcinations at 1200 degrees Celsius for a period of 10 hours or more in an oxidizing environment, about 3.9 m²/g or more after calcinations at 1200 degrees Celsius for a period of 10 hours or more in an oxidizing environment, about 4.0 m²/g or more after calcinations at 1200 degrees Celsius for a period of 10 hours or more in an oxidizing environment, about 4.1 m²/g or more after calcinations at 1200 degrees Celsius for a period of 10 hours or more in an oxidizing environment, about 4.5 m²/g or more after calcinations at 1200 degrees Celsius for a period of 10 hours or more in an oxidizing environment, about 4.6 m²/g or more after calcinations at 1200 degrees Celsius for a period of 10 hours or more in an oxidizing environment, about 5.3 m²/g or more after calcinations at 1200 degrees Celsius for a period of 10 hours or more in an oxidizing environment, about 24 m²/g or more after calcination at 1100 degrees Celsius for a period of 10 hours in an oxidizing environment, about 26 m²/g or more after calcination at 1100 degrees Celsius for a period of 10 hours in an oxidizing environment, about 27 m²/g or more after calcination at 1100 degrees Celsius for a period of 10 hours in an oxidizing environment, about 28 m²/g or more after calcination at 1100 degrees Celsius for a period of 10 hours in an oxidizing environment, about 29 m²/g or more after calcination at 1100 degrees Celsius for a period of 10 hours in an oxidizing environment, about 50 m²/g or more after calcination at 1000 degrees Celsius for a period of 10 hours in an oxidizing environment, about 53 m²/g or more after calcination at 1000 degrees Celsius for a period of 10 hours in an oxidizing environment, about 54 m²/g or more after calcination at 1000 degrees Celsius for a period of 10 hours in an oxidizing environment, about 55 m²/g or more after calcination at 1000 degrees Celsius for a period of 10 hours in an oxidizing environment, about 58 m²/g or more after calcination at 1000 degrees Celsius for a period of 10 hours in an oxidizing environment, about 60 m²/g or more after calcination at 1000 degrees Celsius for a period of 10 hours in an oxidizing environment, and about 63 m²/g or more after calcination at 1000 degrees Celsius for a period of 10 hours in an oxidizing environment.

In some embodiments, the composition can have a total pore volume of about 3.00 cc/g or more and one or more of a BET and apparent surface area of about 50 m²/g or more after calcination at 1000 degrees Celsius for a period of 10 hours in an oxidizing environment. In some embodiments, the composition can have a total pore volume of about 3.00 cc/g or more and one or more of a BET and apparent surface area of about 55 m²/g or more after calcination at 1000 degrees Celsius for a period of 10 hours in an oxidizing environment. In some embodiments, the composition can have a total pore volume of about 3.00 cc/g or more and one or more of the BET and apparent surface area of about 60 m²/g or more after calcination at 1000 degrees Celsius for a period of 10 hours in an oxidizing environment. In some embodiments, the composition can have a total pore volume of about 3.00 cc/g or more and one or more of the BET and apparent surface area of about 24 m²/g or more after calcination at 1100 degrees Celsius for a period of 10 hours in an oxidizing environment. In some embodiments, the composition can have a total pore volume of about 3.00 cc/g or more and one or more of the BET and apparent surface area of about 27 m²/g or more after calcination at 1100 degrees Celsius for a period of 10 hours in an oxidizing environment. In some embodiments, the composition can have a total pore volume of about 2.00 cc/g or more and one or more of the BET and apparent surface area of about 50 m²/g or more after calcination at 1000 degrees Celsius for a period of 10 hours in an oxidizing environment. In some embodiments, the composition can have a total pore volume of about 2.00 cc/g or more and one or more of the BET and apparent surface area of about 55 m²/g or more after calcination at 1000 degrees Celsius for a period of 10 hours in an oxidizing environment. In some embodiments, the composition can have a total pore volume of about 2.00 cc/g or more and one or more of the BET and apparent surface area of about 60 m²/g or more after calcination at 1000 degrees Celsius for a period of 10 hours in an oxidizing environment. In some embodiments, the composition can have a total pore volume of about 2.00 cc/g or more and one or more of the BET and apparent surface area of about 24 m²/g or more after calcination at 1100 degrees Celsius for a period of 10 hours in an oxidizing environment. In some embodiments, the composition can have a total pore volume of about 2.00 cc/g or more and one or more of the BET and apparent surface area of about 27 m²/g or more after calcination at 1100 degrees Celsius for a period of 10 hours in an oxidizing environment. In some embodiments, the composition can have a total pore volume of about 3.00 cc/g or more and one or more of a BET and apparent surface area of about 50 m²/g or more after calcination at 1200 degrees Celsius for a period of 10 hours in an oxidizing environment. In some embodiments, the composition can have a total pore volume of about 3.00 cc/g or more and one or more of a BET and apparent surface area of about 55 m²/g or more after calcination at 1200 degrees Celsius for a period of 10 hours in an oxidizing environment. In some embodiments, the composition can have a total pore volume of about 3.00 cc/g or more and one or more of the BET and apparent surface area of about 60 m²/g or more after calcination at 1200 degrees Celsius for a period of 10 hours in an oxidizing environment. In some embodiments, the composition can have a total pore volume of about 2.00 cc/g or more and one or more of the BET and apparent surface area of about 50 m²/g or more after calcination at 1200 degrees Celsius for a period of 10 hours in an oxidizing environment. In some embodiments, the composition can have a total pore volume of about 2.00 cc/g or more and one or more of the BET and apparent surface area of about 55 m²/g or more after calcination at 1200 degrees Celsius for a period of 10 hours in an oxidizing environment. In some embodiments, the composition can have a total pore volume of about 2.00 cc/g or more and one or more of the BET and apparent surface area of about 60 m²/g or more after calcination at 1200 degrees Celsius for a period of 10 hours in an oxidizing environment. In some embodiments, the composition can have a total pore volume of about 3.00 cc/g or more and one or more of a BET and apparent surface area selected from about from about 1.0 to about 6.0 m²/g after calcinations at 1200 degrees Celsius for a period of 10 hours or more in an oxidizing environment, from about 1.9 to about 5.2 m²/g after calcinations at 1200 degrees Celsius for a period of 10 hours or more in an oxidizing environment, 20 m²/g to about 30 m²/g after calcination at 1100 degrees Celsius for a period of 10 hours in an oxidizing environment. In some embodiments, the composition can have one or more of a BET and apparent surface area selected from about 24 m²/g to about 29 m²/g after calcination at 1100 degrees Celsius for a period of 10 hours in an oxidizing environment. In some embodiments, the composition can have a total pore volume of about 3.00 cc/g or more and one or more of a BET and apparent surface area selected from about 45 m²/g to about 70 m²/g after calcination at 1000 degrees Celsius (and/or 1200 degrees Celsius) for a period of 10 hours in an oxidizing environment. In some embodiments, the composition can have one or more of a BET and apparent surface area selected from about 50 m²/g to about 65 m²/g after calcination at 1000 degrees Celsius (and/or 1100 and/or 1200 degrees Celsius) for a period of 10 hours in an oxidizing environment. In some embodiments, the composition can have a total pore volume comprising one or more of, selected from the group consisting of and/or selected from the group consisting essentially of about 3.00 cc/g or more and 2.00 cc/g or more and one or more of a BET and apparent surface area comprising one or more of, selected from the group consisting of and/or selected from the group consisting essentially of about 1.9 m²/g or more after calcinations at 1200 degrees Celsius for a period of 10 hours or more in an oxidizing environment, about 2.4 m²/g or more after calcinations at 1200 degrees Celsius for a period of 10 hours or more in an oxidizing environment, about 2.9 m²/g or more after calcinations at 1200 degrees Celsius for a period of 10 hours or more in an oxidizing environment, about 3.6 m²/g or more after calcinations at 1200 degrees Celsius for a period of 10 hours or more in an oxidizing environment, about 3.9 m²/g or more after calcinations at 1200 degrees Celsius for a period of 10 hours or more in an oxidizing environment, about 4.0 m²/g or more after calcinations at 1200 degrees Celsius for a period of 10 hours or more in an oxidizing environment, about 4.1 m²/g or more after calcinations at 1200 degrees Celsius for a period of 10 hours or more in an oxidizing environment, about 4.5 m²/g or more after calcinations at 1200 degrees Celsius for a period of 10 hours or more in an oxidizing environment, about 4.6 m²/g or more after calcinations at 1200 degrees Celsius for a period of 10 hours or more in an oxidizing environment, about 5.3 m²/g or more after calcinations at 1200 degrees Celsius for a period of 10 hours or more in an oxidizing environment, and combinations thereof.

In some embodiments, the composition can have a total pore volume of about 1.30 cc/g or more and one or more of the BET and apparent surface area of about 50 m²/g or more after calcination at 1000 degrees Celsius for a period of 10 hours in an oxidizing environment. In some embodiments, the composition can have a total pore volume of about 1.30 cc/g or more and one or more of the BET and apparent surface area of about 55 m²/g or more after calcination at 1000 degrees Celsius for a period of 10 hours in an oxidizing environment. In some embodiments, the composition can have a total pore volume of about 1.30 cc/g or more and one or more of the BET and apparent surface area of about 60 m²/g or more after calcination at 1000 degrees Celsius for a period of 10 hours in an oxidizing environment. In some embodiments, the composition can have a total pore volume of about 1.30 cc/g or more and one or more of the BET and apparent surface area of about 24 m²/g or more after calcination at 1100 degrees Celsius for a period of 10 hours in an oxidizing environment. In some embodiments, the composition can have a total pore volume of about 1.30 cc/g or more and one or more of the BET and apparent surface area of about 27 m²/g or more after calcination at 1100 degrees Celsius for a period of 10 hours in an oxidizing environment. In some embodiments, the composition can have a total pore volume of about 1.3 cc/g or more and one or more of a BET and apparent surface area comprising one or more of, selected from the group consisting of and/or selected from the group consisting essentially of about 1.9 m²/g or more after calcinations at 1200 degrees Celsius for a period of 10 hours or more in an oxidizing environment, about 2.4 m²/g or more after calcinations at 1200 degrees Celsius for a period of 10 hours or more in an oxidizing environment, about 2.9 m²/g or more after calcinations at 1200 degrees Celsius for a period of 10 hours or more in an oxidizing environment, about 3.6 m²/g or more after calcinations at 1200 degrees Celsius for a period of 10 hours or more in an oxidizing environment, about 3.9 m²/g or more after calcinations at 1200 degrees Celsius for a period of 10 hours or more in an oxidizing environment, about 4.0 m²/g or more after calcinations at 1200 degrees Celsius for a period of 10 hours or more in an oxidizing environment, about 4.1 m²/g or more after calcinations at 1200 degrees Celsius for a period of 10 hours or more in an oxidizing environment, about 4.5 m²/g or more after calcinations at 1200 degrees Celsius for a period of 10 hours or more in an oxidizing environment, about 4.6 m²/g or more after calcinations at 1200 degrees Celsius for a period of 10 hours or more in an oxidizing environment, about 5.3 m²/g or more after calcinations at 1200 degrees Celsius for a period of 10 hours or more in an oxidizing environment, and combinations thereof. In some embodiments, the composition can have a total pore volume of about 1.30 cc/g or more and one or more of a BET and apparent surface area selected from about 1.0 to about 6.0 m²/g after calcinations at 1200 degrees Celsius for a period of 10 hours or more in an oxidizing environment, from about 1.9 to about 5.2 m²/g after calcinations at 1200 degrees Celsius for a period of 10 hours or more in an oxidizing environment, from about 20 m²/g to about 30 m²/g after calcination at 1100 degrees Celsius for a period of 10 hours in an oxidizing environment. In some embodiments, the composition can have one or more of a BET and apparent surface area selected from about 24 $m^2/g$ to about 29 $m^2/g$ after calcination at 1100 degrees Celsius for a period of 10 hours in an oxidizing environment. In some embodiments, the composition can have a total pore volume of about 1.30 cc/g or more and one or more of a BET and apparent surface area selected from about 45 $m^2/g$ to about 70 $m^2/g$ after calcination at 1000 degrees Celsius for a period of 10 hours in an oxidizing environment. In some embodiments, the composition can have one or more of a BET and apparent surface area selected from about 50 $m^2/g$ to about 65 $m^2/g$ after calcination at 1000 degrees Celsius for a period of 10 hours in an oxidizing environment.

In some embodiments, the composition can have a total pore volume of about 0.65 cc/g or more and one or more of the BET and apparent surface area of about 50 $m^2/g$ or more after calcination at 1000 degrees Celsius for a period of 10 hours in an oxidizing environment. In some embodiments, the composition can have a total pore volume of about 0.65 cc/g or more and one or more of the BET and apparent surface area of about 55 $m^2/g$ or more after calcination at 1000 degrees Celsius for a period of 10 hours in an oxidizing environment. In some embodiments, the composition can have a total pore volume of about 0.65 cc/g or more and one or more of the BET and apparent surface area of about 60 $m^2/g$ or more after calcination at 1000 degrees Celsius for a period of 10 hours in an oxidizing environment. In some embodiments, the composition can have a total pore volume of about 0.65 cc/g or more and one or more of the BET and apparent surface area of about 24 $m^2/g$ or more after calcination at 1100 degrees Celsius for a period of 10 hours in an oxidizing environment. In some embodiments, the composition can have a total pore volume of about 0.65 cc/g or more and one or more of the BET and apparent surface area of about 27 $m^2/g$ or more after calcination at 1100 degrees Celsius for a period of 10 hours in an oxidizing environment. In some embodiments, the composition can have a total pore volume of about 0.65 cc/g or more and one or more of a BET and apparent surface area comprising one or more of, selected from the group consisting of and/or selected from the group consisting essentially of about 1.9 $m^2/g$ or more after calcinations at 1200 degrees Celsius for a period of 10 hours or more in an oxidizing environment, about 2.4 $m^2/g$ or more after calcinations at 1200 degrees Celsius for a period of 10 hours or more in an oxidizing environment, about 2.9 $m^2/g$ or more after calcinations at 1200 degrees Celsius for a period of 10 hours or more in an oxidizing environment, about 3.6 $m^2/g$ or more after calcinations at 1200 degrees Celsius for a period of 10 hours or more in an oxidizing environment, about 3.9 $m^2/g$ or more after calcinations at 1200 degrees Celsius for a period of 10 hours or more in an oxidizing environment, about 4.0 $m^2/g$ or more after calcinations at 1200 degrees Celsius for a period of 10 hours or more in an oxidizing environment, about 4.1 $m^2/g$ or more after calcinations at 1200 degrees Celsius for a period of 10 hours or more in an oxidizing environment, about 4.5 $m^2/g$ or more after calcinations at 1200 degrees Celsius for a period of 10 hours or more in an oxidizing environment, about 4.6 $m^2/g$ or more after calcinations at 1200 degrees Celsius for a period of 10 hours or more in an oxidizing environment, about 5.3 $m^2/g$ or more after calcinations at 1200 degrees Celsius for a period of 10 hours or more in an oxidizing environment, and combinations thereof. In some embodiments, the composition can have a total pore volume of about 0.65 cc/g or more and one or more of a BET and apparent surface area selected from about from about 1.0 to about 6.0 $m^2/g$ after calcinations at 1200 degrees Celsius for a period of 10 hours or more in an oxidizing environment, from about 1.9 to about 5.2 $m^2/g$ after calcinations at 1200 degrees Celsius for a period of 10 hours or more in an oxidizing environment, 20 $m^2/g$ to about 30 $m^2/g$ after calcination at 1100 degrees Celsius for a period of 10 hours in an oxidizing environment. In some embodiments, the composition can have one or more of a BET and apparent surface area selected from about 24 $m^2/g$ to about 29 $m^2/g$ after calcination at 1100 degrees Celsius for a period of 10 hours in an oxidizing environment. In some embodiments, the composition can have a total pore volume of about 0.65 cc/g or more and one or more of a BET and apparent surface area selected from about 45 $m^2/g$ to about 70 $m^2/g$ after calcination at 1000 degrees Celsius for a period of 10 hours in an oxidizing environment. In some embodiments, the composition can have one or more of a BET and apparent surface area selected from about 50 $m^2/g$ to about 65 $m^2/g$ after calcination at 1000 degrees Celsius for a period of 10 hours in an oxidizing environment.

In some embodiments, the composition can have a total pore volume of about 1.00 cc/g or more after calcination at 1100 degrees Celsius for a period of 10 hours in an oxidizing environment or more and one or more of the BET and apparent surface area of about 50 $m^2/g$ or more after calcination at 1000 degrees Celsius for a period of 10 hours in an oxidizing environment. In some embodiments, the composition can have a total pore volume of about 1.00 cc/g or more after calcination at 1100 degrees Celsius for a period of 10 hours in an oxidizing environment or more and one or more of the BET and apparent surface area of about 55 $m^2/g$ or more after calcination at 1000 degrees Celsius for a period of 10 hours in an oxidizing environment. In some embodiments, the composition can have a total pore volume of about 1.00 cc/g or more after calcination at 1100 degrees Celsius for a period of 10 hours in an oxidizing environment or more and one or more of the BET and apparent surface area of about 60 $m^2/g$ or more after calcination at 1000 degrees Celsius for a period of 10 hours in an oxidizing environment. In some embodiments, the composition can have a total pore volume of about 1.00 cc/g or more after calcination at 1100 degrees Celsius for a period of 10 hours in an oxidizing environment or more and one or more of the BET and apparent surface area of about 24 $m^2/g$ or more after calcination at 1100 degrees Celsius for a period of 10 hours in an oxidizing environment. In some embodiments, the composition can have a total pore volume of about 1.00 cc/g or more after calcination at 1100 degrees Celsius for a period of 10 hours in an oxidizing environment or more and one or more of the BET and apparent surface area of about 27 $m^2/g$ or more after calcination at 1100 degrees Celsius for a period of 10 hours in an oxidizing environment. In some embodiments, the composition can have a total pore volume of about 1.00 cc/g or more and one or more of a BET and apparent surface area selected from about 1.0 to about 6.0 $m^2/g$ after calcinations at 1200 degrees Celsius for a period of 10 hours or more in an oxidizing environment, from about 1.9 to about 5.2 $m^2/g$ after calcinations at 1200 degrees Celsius for a period of 10 hours or more in an oxidizing environment, from about 20 $m^2/g$ to about 30 $m^2/g$ after calcination at 1100 degrees Celsius for a period of 10 hours in an oxidizing environment. In some embodiments, the composition can have one or more of a BET and apparent surface area selected from about 24 $m^2/g$ to about 29 $m^2/g$ after calcination at 1100 degrees Celsius for a period of 10 hours in an oxidizing environment. In some embodiments, the composition can have a total pore volume of about 1.00 cc/g or more and one or more of a BET and apparent surface area selected from about 45 m$^2$/g to about 70 m$^2$/g after calcination at 1000 degrees Celsius for a period of 10 hours in an oxidizing environment. In some embodiments, the composition can have one or more of a BET and apparent surface area selected from about 50 m$^2$/g to about 65 m$^2$/g after calcination at 1000 degrees Celsius for a period of 10 hours in an oxidizing environment.

In some embodiments, the composition can have a total pore volume of about 1.40 cc/g or more after calcination at 1100 degrees Celsius for a period of 10 hours in an oxidizing environment or more and one or more of the BET and apparent surface area of about 50 m$^2$/g or more after calcination at 1000 degrees Celsius for a period of 10 hours in an oxidizing environment. In some embodiments, the composition can have a total pore volume of about 1.40 cc/g or more after calcination at 1100 degrees Celsius for a period of 10 hours in an oxidizing environment or more and one or more of the BET and apparent surface area of about 55 m$^2$/g or more after calcination at 1000 degrees Celsius for a period of 10 hours in an oxidizing environment. In some embodiments, the composition can have a total pore volume of about 1.40 cc/g or more after calcination at 1100 degrees Celsius for a period of 10 hours in an oxidizing environment or more and one or more of the BET and apparent surface area of about 60 m$^2$/g or more after calcination at 1000 degrees Celsius for a period of 10 hours in an oxidizing environment. In some embodiments, the composition can have a total pore volume of about 1.40 cc/g or more after calcination at 1100 degrees Celsius for a period of 10 hours in an oxidizing environment or more and one or more of the BET and apparent surface area of about 24 m$^2$/g or more after calcination at 1100 degrees Celsius for a period of 10 hours in an oxidizing environment. In some embodiments, the composition can have a total pore volume of about 1.40 cc/g or more after calcination at 1200 degrees Celsius for a period of 10 hours or more in an oxidizing environment. In some embodiments, the composition can have a total pore volume of about 1.40 cc/g or more after calcination at 1200 degrees Celsius for a period of 10 hours or more in an oxidizing environment. In some embodiments, the composition can have a total pore volume of about 1.40 cc/g or more after calcination at 1200 degrees Celsius for a period of 10 hours or more in an oxidizing environment. In some embodiments, the composition can have a total pore volume of about 1.40 cc/g or more after calcination at 1200 degrees Celsius for a period of 10 hours or more in an oxidizing environment and one or more of the BET and apparent surface area of about 24 m$^2$/g or more after calcination at 1200 degrees Celsius for a period of 10 hours or more in an oxidizing environment. In some embodiments, the composition can have a total pore volume of about 1.40 cc/g or more after calcination at 1100 degrees Celsius for a period of 10 hours in an oxidizing environment or more and one or more of the BET and apparent surface area of about 27 m$^2$/g or more after calcination at 1100 degrees Celsius for a period of 10 hours in an oxidizing environment. In some embodiments, the composition can have a total pore volume of about 1.40 cc/g or more and one or more of a BET and apparent surface area selected from about 1.0 to about 6.0 m$^2$/g after calcinations at 1200 degrees Celsius for a period of 10 hours or more in an oxidizing environment, from about 1.9 to about 5.2 m$^2$/g after calcinations at 1200 degrees Celsius for a period of 10 hours or more in an oxidizing environment, from about 20 m$^2$/g to about 30 m$^2$/g after calcination at 1100 degrees Celsius for a period of 10 hours in an oxidizing environment. In some embodiments, the composition can have one or more of a BET and apparent surface area selected from about 24 m$^2$/g to about 29 m$^2$/g after calcination at 1100 degrees Celsius for a period of 10 hours in an oxidizing environment. In some embodiments, the composition can have a total pore volume of about 1.40 cc/g or more and one or more of a BET and apparent surface area selected from about 45 m$^2$/g to about 70 m$^2$/g after calcination at 1000 degrees Celsius for a period of 10 hours in an oxidizing environment. In some embodiments, the composition can have one or more of a BET and apparent surface area selected from about 50 m$^2$/g to about 65 m$^2$/g after calcination at 1000 degrees Celsius for a period of 10 hours in an oxidizing environment.

In some embodiments, the composition can have a total pore volume of about 3.00 cc/g or more and a hydrogen thermal program reduction uptake after calcination at 1000 degrees Celsius for 10 hours of about 250 µmole/g or more. In some embodiments, the composition can have a total pore volume of about 3.00 cc/g or more and a hydrogen thermal program reduction uptake after calcination at 1000 degrees Celsius for 10 hours of about 600 µmole/g or more. In some embodiments, the composition can have a total pore volume of about 3.00 cc/g or more and a hydrogen thermal program reduction uptake after calcination at 1000 degrees Celsius for 10 hours of about 1000 µmole/g or more.

In some embodiments, the composition can have a total pore volume of about 3.00 cc/g or more and a hydrogen thermal program reduction uptake after calcination at 1000 degrees Celsius for 10 hours of about 0.54 molar ratio of H$_2$ consumption/CeO$_2$ or more. In some embodiments, the composition can have a total pore volume of about 3.00 cc/g or more and a hydrogen thermal program reduction uptake after calcination at 1000 degrees Celsius for 10 hours of about 0.55 molar ratio of H$_2$ consumption/CeO$_2$ or more. In some embodiments, the composition can have a total pore volume of about 3.00 cc/g or more and a hydrogen thermal program reduction uptake after calcination at 1000 degrees Celsius for 10 hours of about 0.58 molar ratio of H$_2$ consumption/CeO$_2$ or more. In some embodiments, the composition can have a total pore volume of about 3.00 cc/g or more and a hydrogen thermal program reduction uptake after calcination at 1000 degrees Celsius for 10 hours of about 0.59 molar ratio of H$_2$ consumption/CeO$_2$ or more. In some embodiments, the composition can have a total pore volume of about 3.00 cc/g or more and a hydrogen thermal program reduction uptake after calcination at 1000 degrees Celsius for 10 hours of about 0.67 molar ratio of H$_2$ consumption/CeO$_2$ or more. In some embodiments, the composition can have a total pore volume of about 3.00 cc/g or more and a hydrogen thermal program reduction uptake after calcination at 1000 degrees Celsius for 10 hours of about 0.99 molar ratio of H$_2$ consumption/CeO$_2$ or more. In some embodiments, the composition can have a total pore volume of about 3.00 cc/g or more and a hydrogen thermal program reduction uptake after calcination at 1000 degrees Celsius for 10 hours from about 0.54 to about 0.99 molar ratio of H$_2$ consumption/CeO$_2$.

In some embodiments, the composition can have a total pore volume of about 2.00 cc/g or more and a hydrogen thermal program reduction uptake after calcination at 1000 degrees Celsius for 10 hours of about 250 µmole/g or more. In some embodiments, the composition can have a total pore volume of about 2.00 cc/g or more and a hydrogen thermal program reduction uptake after calcination at 1000 degrees Celsius for 10 hours of about 600 µmole/g or more. In some embodiments, the composition can have a total pore volume of about 2.00 cc/g or more and a hydrogen thermal program reduction uptake after calcination at 1000 degrees Celsius for 10 hours of about 1000 μmole/g or more.

In some embodiments, the composition can have a total pore volume of about 2.00 cc/g or more and a hydrogen thermal program reduction uptake after calcination at 1000 degrees Celsius for 10 hours of about 0.54 molar ratio of $H_2$ consumption/$CeO_2$ or more. In some embodiments, the composition can have a total pore volume of about 2.00 cc/g or more and a hydrogen thermal program reduction uptake after calcination at 1000 degrees Celsius for 10 hours of about 0.55 molar ratio of $H_2$ consumption/$CeO_2$ or more. In some embodiments, the composition can have a total pore volume of about 2.00 cc/g or more and a hydrogen thermal program reduction uptake after calcination at 1000 degrees Celsius for 10 hours of about 0.58 molar ratio of $H_2$ consumption/$CeO_2$ or more. In some embodiments, the composition can have a total pore volume of about 2.00 cc/g or more and a hydrogen thermal program reduction uptake after calcination at 1000 degrees Celsius for 10 hours of about 0.59 molar ratio of $H_2$ consumption/$CeO_2$ or more. In some embodiments, the composition can have a total pore volume of about 2.00 cc/g or more and a hydrogen thermal program reduction uptake after calcination at 1000 degrees Celsius for 10 hours of about 0.67 molar ratio of $H_2$ consumption/$CeO_2$ or more. In some embodiments, the composition can have a total pore volume of about 2.00 cc/g or more and a hydrogen thermal program reduction uptake after calcination at 1000 degrees Celsius for 10 hours of about 0.99 molar ratio of $H_2$ consumption/$CeO_2$ or more. In some embodiments, the composition can have a total pore volume of about 2.00 cc/g or more and a hydrogen thermal program reduction uptake after calcination at 1000 degrees Celsius for 10 hours from about 0.54 to about 0.99 molar ratio of $H_2$ consumption/$CeO_2$.

In some embodiments, the composition can have a total pore volume of about 1.30 cc/g or more and a hydrogen thermal program reduction uptake after calcination at 1000 degrees Celsius for 10 hours of about 250 μmole/g or more. In some embodiments, the composition can have a total pore volume of about 1.30 cc/g or more and a hydrogen thermal program reduction uptake after calcination at 1000 degrees Celsius for 10 hours of about 600 μmole/g or more. In some embodiments, the composition can have a total pore volume of about 1.30 cc/g or more and a hydrogen thermal program reduction uptake after calcination at 1000 degrees Celsius for 10 hours of about 1000 μmole/g or more.

In some embodiments, the composition can have a total pore volume of about 1.30 cc/g or more and a hydrogen thermal program reduction uptake after calcination at 1000 degrees Celsius for 10 hours of about 0.54 molar ratio of $H_2$ consumption/$CeO_2$ or more. In some embodiments, the composition can have a total pore volume of about 1.30 cc/g or more and a hydrogen thermal program reduction uptake after calcination at 1000 degrees Celsius for 10 hours of about 0.55 molar ratio of $H_2$ consumption/$CeO_2$ or more. In some embodiments, the composition can have a total pore volume of about 1.30 cc/g or more and a hydrogen thermal program reduction uptake after calcination at 1000 degrees Celsius for 10 hours of about 0.58 molar ratio of $H_2$ consumption/$CeO_2$ or more. In some embodiments, the composition can have a total pore volume of about 1.30 cc/g or more and a hydrogen thermal program reduction uptake after calcination at 1000 degrees Celsius for 10 hours of about 0.59 molar ratio of $H_2$ consumption/$CeO_2$ or more. In some embodiments, the composition can have a total pore volume of about 1.30 cc/g or more and a hydrogen thermal program reduction uptake after calcination at 1000 degrees Celsius for 10 hours of about 0.67 molar ratio of $H_2$ consumption/$CeO_2$ or more. In some embodiments, the composition can have a total pore volume of about 1.30 cc/g or more and a hydrogen thermal program reduction uptake after calcination at 1000 degrees Celsius for 10 hours of about 0.99 molar ratio of $H_2$ consumption/$CeO_2$ or more. In some embodiments, the composition can have a total pore volume of about 1.30 cc/g or more and a hydrogen thermal program reduction uptake after calcination at 1000 degrees Celsius for 10 hours from about 0.54 to about 0.99 molar ratio of $H_2$ consumption/$CeO_2$.

In some embodiments, the composition can have a total pore volume of about 0.65 cc/g or more after calcination at 1100 degrees Celsius for a period of 10 hours in an oxidizing environment and a hydrogen thermal program reduction uptake after calcination at 1000 degrees Celsius for 10 hours of about 250 μmole/g or more. In some embodiments, the composition can have a total pore volume of about 0.65 cc/g or more after calcination at 1100 degrees Celsius for a period of 10 hours in an oxidizing environment and a hydrogen thermal program reduction uptake after calcination at 1000 degrees Celsius for 10 hours of about 600 μmole/g or more. In some embodiments, the composition can have a total pore volume of about 0.65 cc/g or more after calcination at 1100 degrees Celsius for a period of 10 hours in an oxidizing environment and a hydrogen thermal program reduction uptake after calcination at 1000 degrees Celsius for 10 hours of about 1000 μmole/g or more.

In some embodiments, the composition can have a total pore volume of about 0.65 cc/g or more and a hydrogen thermal program reduction uptake after calcination at 1000 degrees Celsius for 10 hours of about 0.54 molar ratio of $H_2$ consumption/$CeO_2$ or more. In some embodiments, the composition can have a total pore volume of about 0.65 cc/g or more and a hydrogen thermal program reduction uptake after calcination at 1000 degrees Celsius for 10 hours of about 0.55 molar ratio of $H_2$ consumption/$CeO_2$ or more. In some embodiments, the composition can have a total pore volume of about 0.65 cc/g or more and a hydrogen thermal program reduction uptake after calcination at 1000 degrees Celsius for 10 hours of about 0.58 molar ratio of $H_2$ consumption/$CeO_2$ or more. In some embodiments, the composition can have a total pore volume of about 0.65 cc/g or more and a hydrogen thermal program reduction uptake after calcination at 1000 degrees Celsius for 10 hours of about 0.59 molar ratio of $H_2$ consumption/$CeO_2$ or more. In some embodiments, the composition can have a total pore volume of about 0.65 cc/g or more and a hydrogen thermal program reduction uptake after calcination at 1000 degrees Celsius for 10 hours of about 0.67 molar ratio of $H_2$ consumption/$CeO_2$ or more. In some embodiments, the composition can have a total pore volume of about 0.65 cc/g or more and a hydrogen thermal program reduction uptake after calcination at 1000 degrees Celsius for 10 hours of about 0.99 molar ratio of $H_2$ consumption/$CeO_2$ or more. In some embodiments, the composition can have a total pore volume of about 0.65 cc/g or more and a hydrogen thermal program reduction uptake after calcination at 1000 degrees Celsius for 10 hours from about 0.54 to about 0.99 molar ratio of $H_2$ consumption/$CeO_2$.

In some embodiments, the composition can have a total pore volume of about 3.00 cc/g or more and a hydrogen thermal program reduction uptake after calcination at 1100 and/or 1200 degrees Celsius for 10 hours of about 250 μmole/g or more. In some embodiments, the composition can have a total pore volume of about 3.00 cc/g or more and a hydrogen thermal program reduction uptake after calcination at 1100 and/or 1200 degrees Celsius for 10 hours of about 600 µmole/g or more. In some embodiments, the composition can have a total pore volume of about 3.00 cc/g or more and a hydrogen thermal program reduction uptake after calcination at 1100 and/or 1200 degrees Celsius for 10 hours of about 1000 µmole/g or more.

In some embodiments, the composition can have a total pore volume of about 3.00 cc/g or more and a hydrogen thermal program reduction uptake after calcination at 1100 and/or 1200 degrees Celsius for 10 hours of about 0.54 molar ratio of $H_2$ consumption/$CeO_2$ or more. In some embodiments, the composition can have a total pore volume of about 3.00 cc/g or more and a hydrogen thermal program reduction uptake after calcination at 1100 and/or 1200 degrees Celsius for 10 hours of about 0.55 molar ratio of $H_2$ consumption/$CeO_2$ or more. In some embodiments, the composition can have a total pore volume of about 3.00 cc/g or more and a hydrogen thermal program reduction uptake after calcination at 1100 and/or 1200 degrees Celsius for 10 hours of about 0.58 molar ratio of $H_2$ consumption/$CeO_2$ or more. In some embodiments, the composition can have a total pore volume of about 3.00 cc/g or more and a hydrogen thermal program reduction uptake after calcination at 1100 and/or 1200 degrees Celsius for 10 hours of about 0.59 molar ratio of $H_2$ consumption/$CeO_2$ or more. In some embodiments, the composition can have a total pore volume of about 3.00 cc/g or more and a hydrogen thermal program reduction uptake after calcination at 1100 and/or 1200 degrees Celsius for 10 hours of about 0.67 molar ratio of $H_2$ consumption/$CeO_2$ or more. In some embodiments, the composition can have a total pore volume of about 3.00 cc/g or more and a hydrogen thermal program reduction uptake after calcination at 1100 and/or 1200 degrees Celsius for 10 hours of about 0.99 molar ratio of $H_2$ consumption/$CeO_2$ or more. In some embodiments, the composition can have a total pore volume of about 3.00 cc/g or more and a hydrogen thermal program reduction uptake after calcination at 1100 and/or 1200 degrees Celsius for 10 hours from about 0.54 to about 0.99 molar ratio of $H_2$ consumption/$CeO_2$.

In some embodiments, the composition can have a total pore volume of about 2.00 cc/g or more and a hydrogen thermal program reduction uptake after calcination at 1100 and/or 1200 degrees Celsius for 10 hours of about 250 µmole/g or more. In some embodiments, the composition can have a total pore volume of about 2.00 cc/g or more and a hydrogen thermal program reduction uptake after calcination at 1100 and/or 1200 degrees Celsius for 10 hours of about 600 µmole/g or more. In some embodiments, the composition can have a total pore volume of about 2.00 cc/g or more and a hydrogen thermal program reduction uptake after calcination at 1100 and/or 1200 degrees Celsius for 10 hours of about 1000 µmole/g or more.

In some embodiments, the composition can have a total pore volume of about 2.00 cc/g or more and a hydrogen thermal program reduction uptake after calcination at 1100 and/or 1200 degrees Celsius for 10 hours of about 0.54 molar ratio of $H_2$ consumption/$CeO_2$ or more. In some embodiments, the composition can have a total pore volume of about 2.00 cc/g or more and a hydrogen thermal program reduction uptake after calcination at 1100 and/or 1200 degrees Celsius for 10 hours of about 0.55 molar ratio of $H_2$ consumption/$CeO_2$ or more. In some embodiments, the composition can have a total pore volume of about 2.00 cc/g or more and a hydrogen thermal program reduction uptake after calcination at 1100 and/or 1200 degrees Celsius for 10 hours of about 0.58 molar ratio of $H_2$ consumption/$CeO_2$ or more. In some embodiments, the composition can have a total pore volume of about 2.00 cc/g or more and a hydrogen thermal program reduction uptake after calcination at 1100 and/or 1200 degrees Celsius for 10 hours of about 0.59 molar ratio of $H_2$ consumption/$CeO_2$ or more. In some embodiments, the composition can have a total pore volume of about 2.00 cc/g or more and a hydrogen thermal program reduction uptake after calcination at 1100 and/or 1200 degrees Celsius for 10 hours of about 0.67 molar ratio of $H_2$ consumption/$CeO_2$ or more. In some embodiments, the composition can have a total pore volume of about 2.00 cc/g or more and a hydrogen thermal program reduction uptake after calcination at 1100 and/or 1200 degrees Celsius for 10 hours of about 0.99 molar ratio of $H_2$ consumption/$CeO_2$ or more. In some embodiments, the composition can have a total pore volume of about 2.00 cc/g or more and a hydrogen thermal program reduction uptake after calcination at 1100 and/or 1200 degrees Celsius for 10 hours from about 0.54 to about 0.99 molar ratio of $H_2$ consumption/$CeO_2$.

In some embodiments, the composition can have a total pore volume of about 1.30 cc/g or more and a hydrogen thermal program reduction uptake after calcination at 1100 and/or 1200 degrees Celsius for 10 hours of about 250 µmole/g or more. In some embodiments, the composition can have a total pore volume of about 1.30 cc/g or more and a hydrogen thermal program reduction uptake after calcination at 1100 and/or 1200 degrees Celsius for 10 hours of about 600 µmole/g or more. In some embodiments, the composition can have a total pore volume of about 1.30 cc/g or more and a hydrogen thermal program reduction uptake after calcination at 1100 and/or 1200 degrees Celsius for 10 hours of about 1000 µmole/g or more.

In some embodiments, the composition can have a total pore volume of about 1.30 cc/g or more and a hydrogen thermal program reduction uptake after calcination at 1100 and/or 1200 degrees Celsius for 10 hours of about 0.54 molar ratio of $H_2$ consumption/$CeO_2$ or more. In some embodiments, the composition can have a total pore volume of about 1.30 cc/g or more and a hydrogen thermal program reduction uptake after calcination at 1100 and/or 1200 degrees Celsius for 10 hours of about 0.55 molar ratio of $H_2$ consumption/$CeO_2$ or more. In some embodiments, the composition can have a total pore volume of about 1.30 cc/g or more and a hydrogen thermal program reduction uptake after calcination at 1100 and/or 1200 degrees Celsius for 10 hours of about 0.58 molar ratio of $H_2$ consumption/$CeO_2$ or more. In some embodiments, the composition can have a total pore volume of about 1.30 cc/g or more and a hydrogen thermal program reduction uptake after calcination at 1100 and/or 1200 degrees Celsius for 10 hours of about 0.59 molar ratio of $H_2$ consumption/$CeO_2$ or more. In some embodiments, the composition can have a total pore volume of about 1.30 cc/g or more and a hydrogen thermal program reduction uptake after calcination at 1100 and/or 1200 degrees Celsius for 10 hours of about 0.67 molar ratio of $H_2$ consumption/$CeO_2$ or more. In some embodiments, the composition can have a total pore volume of about 1.30 cc/g or more and a hydrogen thermal program reduction uptake after calcination at 1100 and/or 1200 degrees Celsius for 10 hours of about 0.99 molar ratio of $H_2$ consumption/$CeO_2$ or more. In some embodiments, the composition can have a total pore volume of about 1.30 cc/g or more and a hydrogen thermal program reduction uptake after calcination at 1100 and/or 1200 degrees Celsius for 10 hours from about 0.54 to about 0.99 molar ratio of $H_2$ consumption/$CeO_2$.

In some embodiments, the composition can have a total pore volume of about 0.65 cc/g or more after calcination at 1100 degrees Celsius for a period of 10 hours in an oxidizing environment and a hydrogen thermal program reduction uptake after calcination at 1100 and/or 1200 degrees Celsius for 10 hours of about 250 μmole/g or more. In some embodiments, the composition can have a total pore volume of about 0.65 cc/g or more after calcination at 1100 degrees Celsius for a period of 10 hours in an oxidizing environment and a hydrogen thermal program reduction uptake after calcination at 1100 and/or 1200 degrees Celsius for 10 hours of about 600 μmole/g or more. In some embodiments, the composition can have a total pore volume of about 0.65 cc/g or more after calcination at 1100 degrees Celsius for a period of 10 hours in an oxidizing environment and a hydrogen thermal program reduction uptake after calcination at 1100 and/or 1200 degrees Celsius for 10 hours of about 1000 μmole/g or more.

In some embodiments, the composition can have a total pore volume of about 0.65 cc/g or more and a hydrogen thermal program reduction uptake after calcination at 1100 and/or 1200 degrees Celsius for 10 hours of about 0.54 molar ratio of $H_2$ consumption/$CeO_2$ or more. In some embodiments, the composition can have a total pore volume of about 0.65 cc/g or more and a hydrogen thermal program reduction uptake after calcination at 1100 and/or 1200 degrees Celsius for 10 hours of about 0.55 molar ratio of $H_2$ consumption/$CeO_2$ or more. In some embodiments, the composition can have a total pore volume of about 0.65 cc/g or more and a hydrogen thermal program reduction uptake after calcination at 1100 and/or 1200 degrees Celsius for 10 hours of about 0.58 molar ratio of $H_2$ consumption/$CeO_2$ or more. In some embodiments, the composition can have a total pore volume of about 0.65 cc/g or more and a hydrogen thermal program reduction uptake after calcination at 1100 and/or 1200 degrees Celsius for 10 hours of about 0.59 molar ratio of $H_2$ consumption/$CeO_2$ or more. In some embodiments, the composition can have a total pore volume of about 0.65 cc/g or more and a hydrogen thermal program reduction uptake after calcination at 1100 and/or 1200 degrees Celsius for 10 hours of about 0.67 molar ratio of $H_2$ consumption/$CeO_2$ or more. In some embodiments, the composition can have a total pore volume of about 0.65 cc/g or more and a hydrogen thermal program reduction uptake after calcination at 1100 and/or 1200 degrees Celsius for 10 hours of about 0.99 molar ratio of $H_2$ consumption/$CeO_2$ or more. In some embodiments, the composition can have a total pore volume of about 0.65 cc/g or more and a hydrogen thermal program reduction uptake after calcination at 1100 and/or 1200 degrees Celsius for 10 hours from about 0.54 to about 0.99 molar ratio of $H_2$ consumption/$CeO_2$.

In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 250 μmole/g or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 600 μmole/g or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 1000 μmole/g or more.

In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 0.54 molar ratio of $H_2$ consumption/$CeO_2$ or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 0.55 molar ratio of $H_2$ consumption/$CeO_2$ or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 0.58 molar ratio of $H_2$ consumption/$CeO_2$ or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 0.59 molar ratio of $H_2$ consumption/$CeO_2$ or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 0.67 molar ratio of $H_2$ consumption/$CeO_2$ or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours of about 0.99 molar ratio of $H_2$ consumption/$CeO_2$ or more. In some embodiments, the composition can have a total pore volume of about 1.00 cc/g or more after calcination at 1100 degrees Celsius for a period of 10 hours in an oxidizing environment and a hydrogen thermal program reduction uptake after calcination at 1000 degrees Celsius for 10 hours from about 0.54 to about 0.99 molar ratio of $H_2$ consumption/$CeO_2$.

In some embodiments, the composition can have a total pore volume of about 1.40 cc/g or more after calcination after calcination at 1000 degrees Celsius for 10 hours for a period of 10 hours in an oxidizing environment and a hydrogen thermal program reduction uptake after calcination at 1000 degrees Celsius for 10 hours of about 250 μmole/g or more. In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 600 μmole/g or more. In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 1000 μmole/g or more.

In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 0.54 molar ratio of $H_2$ consumption/$CeO_2$ or more.

In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 0.55 molar ratio of $H_2$ consumption/$CeO_2$ or more. In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 0.58 molar ratio of $H_2$ consumption/$CeO_2$ or more. In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 0.59 molar ratio of $H_2$ consumption/$CeO_2$ or more. In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 0.67 molar ratio of $H_2$ consumption/$CeO_2$ or more. In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours of about 0.99 molar ratio of $H_2$ consumption/$CeO_2$ or more. In some embodiments, the composition can have a total pore volume of about 1.40 cc/g or more after calcination at 1100 degrees Celsius for a period of 10 hours in an oxidizing environment and a hydrogen thermal program reduction uptake after calcination at 1000 degrees Celsius for 10 hours from about 0.54 to about 0.99 molar ratio of $H_2$ consumption/$CeO_2$.

In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 250 µmole/g or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 600 µmole/g or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 1000 µmole/g or more.

In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 0.54 molar ratio of $H_2$ consumption/$CeO_2$ or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 0.55 molar ratio of $H_2$ consumption/$CeO_2$ or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 0.58 molar ratio of $H_2$ consumption/$CeO_2$ or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 0.59 molar ratio of $H_2$ consumption/$CeO_2$ or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 0.67 molar ratio of $H_2$ consumption/$CeO_2$ or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours of about 0.99 molar ratio of $H_2$ consumption/$CeO_2$ or more. In some embodiments, the composition can have a total pore volume of about 1.00 cc/g or more after calcination at 1200 degrees Celsius for a period of 10 hours in an oxidizing environment and a hydrogen thermal program reduction uptake after calcination at 1200 degrees Celsius for 10 hours from about 0.54 to about 0.99 molar ratio of $H_2$ consumption/$CeO_2$.

In some embodiments, the composition can have a total pore volume of about 1.40 cc/g or more after calcination after calcination at 1200 degrees Celsius for 10 hours for a period of 10 hours in an oxidizing environment and a hydrogen thermal program reduction uptake after calcination at 1200 degrees Celsius for 10 hours of about 250 µmole/g or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 600 µmole/g or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 1000 µmole/g or more.

In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 0.54 molar ratio of $H_2$ consumption/$CeO_2$ or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 0.55 molar ratio of $H_2$ consumption/$CeO_2$ or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 0.58 molar ratio of $H_2$ consumption/$CeO_2$ or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 0.59 molar ratio of $H_2$ consumption/$CeO_2$ or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 0.67 molar ratio of $H_2$ consumption/$CeO_2$ or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours of about 0.99 molar ratio of $H_2$ consumption/$CeO_2$ or more. In some embodiments, the composition can have a total pore volume of about 1.40 cc/g or more after calcination at 1200 degrees Celsius for a period of 10 hours in an oxidizing environment and a hydrogen thermal program reduction uptake after calcination at 1200 degrees Celsius for 10 hours from about 0.54 to about 0.99 molar ratio of $H_2$ consumption/$CeO_2$.

In some embodiments, the composition can have a hydrogen thermal program reduction uptake after calcination at 1000 degrees Celsius for 10 hours of one of about 250, 600 or 1000 µmole/g or more, a total pore volume of about 3.00 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 µmole/g or more, a total pore volume of about 3.00 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 µmole/g or more, a total pore volume of about 3.00 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 µmole/g or more, a total pore volume of about 3.00 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 µmole/g or more, a total pore volume of about 3.00 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 3.00 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 3.00 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 3.00 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 3.00 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 3.00 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 250, 600 or 1000 μmole/g or more, a total pore volume of about 2.00 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 μmole/g or more, a total pore volume of about 2.00 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 μmole/g or more, a total pore volume of about 2.00 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 μmole/g or more, a total pore volume of about 2.00 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 μmole/g or more, a total pore volume of about 2.00 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 2.00 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 2.00 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 2.00 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 2.00 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 2.00 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 250, 600 or 1000 μmole/g or more, a total pore volume of about 1.30 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 μmole/g or more, a total pore volume of about 1.30 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 µmole/g or more, a total pore volume of about 1.30 cc/g or more and one or more of the BET and apparent surface area of about 60 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 µmole/g or more, a total pore volume of about 1.30 cc/g or more and one or more of the BET and apparent surface area of about 24 m$^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 250, 600 or 1000 µmole/g or more, a total pore volume of about 1.30 cc/g or more and one or more of the BET and apparent surface area of about 27 m$^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of H$_2$ consumption/CeO$_2$ or more, a total pore volume of about 1.30 cc/g or more and one or more of the BET and apparent surface area of about 50 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of H$_2$ consumption/CeO$_2$ or more, a total pore volume of about 1.30 cc/g or more and one or more of the BET and apparent surface area of about 55 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of H$_2$ consumption/CeO$_2$ or more, a total pore volume of about 1.30 cc/g or more and one or more of the BET and apparent surface area of about 60 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of H$_2$ consumption/CeO$_2$ or more, a total pore volume of about 1.30 cc/g or more and one or more of the BET and apparent surface area of about 24 m$^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of H$_2$ consumption/CeO$_2$ or more, a total pore volume of about 1.30 cc/g or more and one or more of the BET and apparent surface area of about 27 m$^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours from about 0.54 to about 0.99 molar ratio of H$_2$ consumption/CeO$_2$, a total pore volume of about 1.30 cc/g or more and one or more of the BET and apparent surface area of about 50 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of H$_2$ consumption/CeO$_2$, a total pore volume of about 1.30 cc/g or more and one or more of the BET and apparent surface area of about 55 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of H$_2$ consumption/CeO$_2$, a total pore volume of about 1.30 cc/g or more and one or more of the BET and apparent surface area of about 60 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of H$_2$ consumption/CeO$_2$, a total pore volume of about 1.30 cc/g or more and one or more of the BET and apparent surface area of about 24 m$^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of H$_2$ consumption/CeO$_2$, a total pore volume of about 1.30 cc/g or more and one or more of the BET and apparent surface area of about 27 m$^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one or more of about 250, 600 or 1000 µmole/g or more and a total pore volume of about 0.65 cc/g or more after calcination at 1100 degrees Celsius for a period of 10 hours in an oxidizing environment one or more of a BET and apparent surface area of about 50 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 0.65 cc/g or more after calcination at 1100 degrees Celsius for a period of 10 hours in an oxidizing environment one or more of a BET and apparent surface area of about 55 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 0.65 cc/g or more after calcination at 1100 degrees Celsius for a period of 10 hours in an oxidizing environment one or more of a BET and apparent surface area of about 60 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 0.65 cc/g or more after calcination at 1100 degrees Celsius for a period of 10 hours in an oxidizing environment one or more of a BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 μmole/g or more and a total pore volume of about 0.65 cc/g or more after calcination at 1100 degrees Celsius for a period of 10 hours in an oxidizing environment one or more of a BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 0.65 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 0.65 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 0.65 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 0.65 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 0.65 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 0.65 cc/g or more and one or more of the BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 0.65 cc/g or more and one or more of the BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 0.65 cc/g or more and one or more of the BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 0.65 cc/g or more and one or more of the BET and apparent surface area of about 24 m²/g or more after calcination at 1100 degrees Celsius for a period of 10 hours in an oxidizing environment. In some embodiments, the composition can have a hydrogen thermal program reduction after calcination at 1000 degrees Celsius for 10 hours from about 0.54 to about 0.99 molar ratio of $H_2$ consumption/$CeO_2$, a total pore volume of about 0.65 cc/g or more and one or more of the BET and apparent surface area of about 27 m²/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one or more of about 250, 600 or 1000 μmole/g or more and a total pore volume of about 1.00 cc/g or more after calcination at 1100 degrees Celsius for a period of 10 hours in an oxidizing environment one or more of a BET and apparent surface area of about 50 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 μmole/g or more and a total pore volume of about 1.00 cc/g or more after calcination at 1100 degrees Celsius for a period of 10 hours in an oxidizing environment one or more of a BET and apparent surface area of about 55 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 μmole/g or more and a total pore volume of about 1.00 cc/g or more after calcination at 1100 degrees Celsius for a period of 10 hours in an oxidizing environment one or more of a BET and apparent surface area of about 60 m²/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 μmole/g or more and a total pore volume of about 1.00 cc/g or more after calcination at 1100 degrees Celsius for a period of 10 hours in an oxidizing environment one or more of a BET and apparent surface area of about. In some embodiments, the composition can have a hydrogen thermal program reduction uptake after calcination at 1000 degrees Celsius for 10 hours of one or more of about 250, 600 or 1000 μmole/g or more and a total pore volume of about 1.00 cc/g or more after calcination at 1100 degrees Celsius for a period of 10 hours in an oxidizing environment one or more of a BET and apparent surface area of about 24 m²/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 1.00 cc/g or more after calcination at 1100 degrees Celsius for a period of 10 hours in an oxidizing environment one or more of a BET and apparent surface area of about 27 m$^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 50 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 55 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 60 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 24 m$^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 27 m$^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.00 cc/g or more and one or more of the BET and apparent surface area of about 50 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.00 cc/g or more and one or more of the BET and apparent surface area of about 55 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.00 cc/g or more and one or more of the BET and apparent surface area of about 60 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.00 cc/g or more and one or more of the BET and apparent surface area of about 24 m$^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.00 cc/g or more and one or more of the BET and apparent surface area of about 27 m$^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one or more of about 250, 600 or 1000 µmole/g or more and a total pore volume of about 1.40 cc/g or more after calcination at 1100 degrees Celsius for a period of 10 hours in an oxidizing environment one or more of a BET and apparent surface area of about 50 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 1.40 cc/g or more after calcination at 1100 degrees Celsius for a period of 10 hours in an oxidizing environment one or more of a BET and apparent surface area of about 55 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 1.40 cc/g or more after calcination at 1100 degrees Celsius for a period of 10 hours in an oxidizing environment one or more of a BET and apparent surface area of about 60 m$^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 1.40 cc/g or more after calcination at 1100 degrees Celsius for a period of 10 hours in an oxidizing environment one or more of a BET and apparent surface area of about 24 m$^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one or more of about 250, 600 or 1000 µmole/g or more and a total pore volume of about 1.40 cc/g or more after calcination at 1100 degrees Celsius for a period of 10 hours in an oxidizing environment one or more of a BET and apparent surface area of about 27 m$^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 50 $m^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 55 $m^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 60 $m^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 24 $m^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 27 $m^2$/g or more after calcination at 1100 degrees Celsius for a period of 10 hours in an oxidizing environment.

In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.40 cc/g or more and one or more of the BET and apparent surface area of about 50 $m^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.40 cc/g or more and one or more of the BET and apparent surface area of about 55 $m^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.40 cc/g or more and one or more of the BET and apparent surface area of about 60 $m^2$/g or more after calcination at 1000 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.40 cc/g or more and one or more of the BET and apparent surface area of about 24 $m^2$/g or more after calcination at 1100 degrees Celsius for a period of 10 hours in an oxidizing environment. In some embodiments, the composition can have a hydrogen thermal program reduction uptake after calcination at 1000 degrees Celsius for 10 hours from about 0.54 to about 0.99 molar ratio of $H_2$ consumption/$CeO_2$, a total pore volume of about 1.40 cc/g or more and one or more of the BET and apparent surface area of about 27 $m^2$/g or more after calcination at 1100 degrees Celsius for a period of 10 hours in an oxidizing environment.

In some embodiments, the composition can have a hydrogen thermal program reduction uptake after calcination at 1200 degrees Celsius for 10 hours of one of about 250, 600 or 1000 μmole/g or more, a total pore volume of about 3.00 cc/g or more and one or more of the BET and apparent surface area of about 50 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 μmole/g or more, a total pore volume of about 3.00 cc/g or more and one or more of the BET and apparent surface area of about 55 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 μmole/g or more, a total pore volume of about 3.00 cc/g or more and one or more of the BET and apparent surface area of about 60 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 μmole/g or more, a total pore volume of about 3.00 cc/g or more and one or more of the BET and apparent surface area of about 24 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 μmole/g or more, a total pore volume of about 3.00 cc/g or more and one or more of the BET and apparent surface area of about 27 $m^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 50 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 55 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 60 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 24 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 3.00 cc/g or more and one or more of the BET and apparent surface area of about 27 $m^2/g$ or more after calcination at 1200 degrees Celsius for a period of 10 hours in an oxidizing environment.

In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 3.00 cc/g or more and one or more of the BET and apparent surface area of about 50 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 3.00 cc/g or more and one or more of the BET and apparent surface area of about 55 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 3.00 cc/g or more and one or more of the BET and apparent surface area of about 60 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 3.00 cc/g or more and one or more of the BET and apparent surface area of about 24 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 3.00 cc/g or more and one or more of the BET and apparent surface area of about 27 $m^2/g$ or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 250, 600 or 1000 µmole/g or more, a total pore volume of about 2.00 cc/g or more and one or more of the BET and apparent surface area of about 50 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 2.00 cc/g or more and one or more of the BET and apparent surface area of about 55 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 2.00 cc/g or more and one or more of the BET and apparent surface area of about 60 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 2.00 cc/g or more and one or more of the BET and apparent surface area of about 24 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 2.00 cc/g or more and one or more of the BET and apparent surface area of about 27 $m^2/g$ or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 50 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 55 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 60 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 24 $m^2/g$ or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 2.00 cc/g or more and one or more of the BET and apparent surface area of about 27 $m^2/g$ or more after calcination at 1200 degrees Celsius for a period of 10 hours in an oxidizing environment.

In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 2.00 cc/g or more and one or more of the BET and apparent surface area of about 50 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 2.00 cc/g or more and one or more of the BET and apparent surface area of about 55 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 2.00 cc/g or more and one or more of the BET and apparent surface area of about 60 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 2.00 cc/g or more and one or more of the BET and apparent surface area of about 24 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 2.00 cc/g or more and one or more of the BET and apparent surface area of about 27 m$^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 250, 600 or 1000 µmole/g or more, a total pore volume of about 1.30 cc/g or more and one or more of the BET and apparent surface area of about 50 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 1.30 cc/g or more and one or more of the BET and apparent surface area of about 55 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 1.30 cc/g or more and one or more of the BET and apparent surface area of about 60 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 1.30 cc/g or more and one or more of the BET and apparent surface area of about 24 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 250, 600 or 1000 µmole/g or more, a total pore volume of about 1.30 cc/g or more and one or more of the BET and apparent surface area of about 27 m$^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.30 cc/g or more and one or more of the BET and apparent surface area of about 50 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.30 cc/g or more and one or more of the BET and apparent surface area of about 55 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.30 cc/g or more and one or more of the BET and apparent surface area of about 60 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.30 cc/g or more and one or more of the BET and apparent surface area of about 24 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.30 cc/g or more and one or more of the BET and apparent surface area of about 27 m$^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.30 cc/g or more and one or more of the BET and apparent surface area of about 50 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.30 cc/g or more and one or more of the BET and apparent surface area of about 55 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.30 cc/g or more and one or more of the BET and apparent surface area of about 60 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of H$_2$ consumption/CeO$_2$, a total pore volume of about 1.30 cc/g or more and one or more of the BET and apparent surface area of about 24 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of H$_2$ consumption/CeO$_2$, a total pore volume of about 1.30 cc/g or more and one or more of the BET and apparent surface area of about 27 m$^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one or more of about 250, 600 or 1000 μmole/g or more and a total pore volume of about 0.65 cc/g or more after calcination at 1200 degrees Celsius for a period of 10 hours in an oxidizing environment one or more of a BET and apparent surface area of about 50 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 0.65 cc/g or more after calcination at 1200 degrees Celsius for a period of 10 hours in an oxidizing environment one or more of a BET and apparent surface area of about 55 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 0.65 cc/g or more after calcination at 1200 degrees Celsius for a period of 10 hours in an oxidizing environment one or more of a BET and apparent surface area of about 60 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 0.65 cc/g or more after calcination at 1200 degrees Celsius for a period of 10 hours in an oxidizing environment one or more of a BET and apparent surface area of about 24 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 0.65 cc/g or more after calcination at 1200 degrees Celsius for a period of 10 hours in an oxidizing environment one or more of a BET and apparent surface area of about 27 m$^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of H$_2$ consumption/CeO$_2$ or more, a total pore volume of about 0.65 cc/g or more and one or more of the BET and apparent surface area of about 50 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of H$_2$ consumption/CeO$_2$ or more, a total pore volume of about 0.65 cc/g or more and one or more of the BET and apparent surface area of about 55 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of H$_2$ consumption/CeO$_2$ or more, a total pore volume of about 0.65 cc/g or more and one or more of the BET and apparent surface area of about 60 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of H$_2$ consumption/CeO$_2$ or more, a total pore volume of about 0.65 cc/g or more and one or more of the BET and apparent surface area of about 24 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of H$_2$ consumption/CeO$_2$ or more, a total pore volume of about 0.65 cc/g or more and one or more of the BET and apparent surface area of about 27 m$^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours from about 0.54 to about 0.99 molar ratio of H$_2$ consumption/CeO$_2$, a total pore volume of about 0.65 cc/g or more and one or more of the BET and apparent surface area of about 50 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of H$_2$ consumption/CeO$_2$, a total pore volume of about 0.65 cc/g or more and one or more of the BET and apparent surface area of about 55 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of H$_2$ consumption/CeO$_2$, a total pore volume of about 0.65 cc/g or more and one or more of the BET and apparent surface area of about 60 m$^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of H$_2$ consumption/CeO$_2$, a total pore volume of about 0.65 cc/g or more and one or more of the BET and apparent surface area of about 24 m$^2$/g or more after calcination at 1200 degrees Celsius for a period of 10 hours in an oxidizing environment. In some embodiments, the composition can have a hydrogen thermal program reduction after calcination at 1200 degrees Celsius for 10 hours from about 0.54 to about 0.99 molar ratio of $H_2$ consumption/$CeO_2$, a total pore volume of about 0.65 cc/g or more and one or more of the BET and apparent surface area of about 27 $m^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one or more of about 250, 600 or 1000 µmole/g or more and a total pore volume of about 1.00 cc/g or more after calcination at 1200 degrees Celsius for a period of 10 hours in an oxidizing environment one or more of a BET and apparent surface area of about 50 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 µmole/g or more and a total pore volume of about 1.00 cc/g or more after calcination at 1200 degrees Celsius for a period of 10 hours in an oxidizing environment one or more of a BET and apparent surface area of about 55 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 µmole/g or more and a total pore volume of about 1.00 cc/g or more after calcination at 1200 degrees Celsius for a period of 10 hours in an oxidizing environment one or more of a BET and apparent surface area of about 60 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 µmole/g or more and a total pore volume of about 1.00 cc/g or more after calcination at 1200 degrees Celsius for a period of 10 hours in an oxidizing environment one or more of a BET and apparent surface area of about. In some embodiments, the composition can have a hydrogen thermal program reduction uptake after calcination at 1200 degrees Celsius for 10 hours of one or more of about 250, 600 or 1000 µmole/g or more and a total pore volume of about 1.00 cc/g or more after calcination at 1200 degrees Celsius for a period of 10 hours in an oxidizing environment one or more of a BET and apparent surface area of about 24 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 µmole/g or more and a total pore volume of about 1.00 cc/g or more after calcination at 1200 degrees Celsius for a period of 10 hours in an oxidizing environment one or more of a BET and apparent surface area of about 27 $m^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 50 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 55 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 60 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 24 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.00 cc/g or more and one or more of the BET and apparent surface area of about 27 $m^2$/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.00 cc/g or more and one or more of the BET and apparent surface area of about 50 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.00 cc/g or more and one or more of the BET and apparent surface area of about 55 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.00 cc/g or more and one or more of the BET and apparent surface area of about 60 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.00 cc/g or more and one or more of the BET and apparent surface area of about 24 $m^2$/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.00 cc/g or more and one or more of the BET and apparent surface area of about 27 m²/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one or more of about 250, 600 or 1000 μmole/g or more and a total pore volume of about 1.40 cc/g or more after calcination at 1200 degrees Celsius for a period of 10 hours in an oxidizing environment one or more of a BET and apparent surface area of about 50 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 1.40 cc/g or more after calcination at 1200 degrees Celsius for a period of 10 hours in an oxidizing environment one or more of a BET and apparent surface area of about 55 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 1.40 cc/g or more after calcination at 1200 degrees Celsius for a period of 10 hours in an oxidizing environment one or more of a BET and apparent surface area of about 60 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 1.40 cc/g or more after calcination at 1200 degrees Celsius for a period of 10 hours in an oxidizing environment one or more of a BET and apparent surface area of about 24 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one or more of about 250, 600 or 1000 μmole/g or more and a total pore volume of about 1.40 cc/g or more after calcination at 1200 degrees Celsius for a period of 10 hours in an oxidizing environment one or more of a BET and apparent surface area of about 27 m²/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 50 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 55 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 60 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 24 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours of one of about 0.54, 0.55, 0.58, 0.59, 0.67, 0.99 molar ratio of $H_2$ consumption/$CeO_2$ or more, a total pore volume of about 1.40 cc/g or more and one or more of the BET and apparent surface area of about 27 m²/g or more after calcination at 1200 degrees Celsius for a period of 10 hours in an oxidizing environment.

In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.40 cc/g or more and one or more of the BET and apparent surface area of about 50 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.40 cc/g or more and one or more of the BET and apparent surface area of about 55 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.40 cc/g or more and one or more of the BET and apparent surface area of about 60 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.40 cc/g or more and one or more of the BET and apparent surface area of about 24 m²/g or more after calcination at 1200 degrees Celsius for a period of 10 hours in an oxidizing environment. In some embodiments, the composition can have a hydrogen thermal program reduction uptake after calcination at 1200 degrees Celsius for 10 hours from about 0.54 to about 0.99 molar ratio of $H_2$ consumption/$CeO_2$, a total pore volume of about 1.40 cc/g or more and one or more of the BET and apparent surface area of about 27 m²/g or more after calcination at 1200 degrees Celsius for a period of 10 hours in an oxidizing environment.

In accordance with some embodiments, the composition can contain one or more other rare earth oxides. In some embodiments the one or more rare earth oxides can be lanthanum oxide and one or both of yttrium oxide and neodymium oxide. In some embodiments, the one or more other rare earth oxides can be lanthanum oxide and one or both of yttrium oxide and neodymium oxide. In some embodiments, the composition can contain from about 1.5 to about 6 wt % lanthanum oxide.

In accordance with some embodiments is a method of making a composition that includes a step of combining water soluble zirconium and cerium salts in appropriate ratios optionally with one or more water soluble rare earth salts other than cerium. The method can also include a step of dissolving the water soluble zirconium and cerium salts and the optional one or more water soluble rare earth salts other than cerium in distilled deionized water to form a metal-containing solution. The method can also include a step of adding hydrogen peroxide to the metal-containing solution. In some embodiments, the method can also include, after the addition of hydrogen peroxide to the metal-containing solution, adding a base such an ammonia water to the metal-containing solution. In some embodiments, the method can also include, after the addition of hydrogen peroxide to the metal-containing solution, precipitating at least most of the metals in the metal-containing solution by adding a base such as an ammonia water to the metal-containing solution or adding the metal containing solution to a base such as an ammonia water solution or simultaneously adding the metal containing solution and a base such as ammonia water. The method can also include, separating the precipitated metals from the metal-containing solution. In some embodiments, the method can include, after separating the precipitated metals from the metal-containing solution, washing the precipitated metals first with distilled deionized water and, thereafter the water washing, washing with alcohol such as ethanol or isopropanol. In some embodiments, the washed precipitated metals can be dispersed in an alcohol such as ethanol or isopropanol and charged to a reactor vessel. According to some embodiments, after charging reactor vessel, the charged reactor vessel can be purged with an inert gas (such as argon or nitrogen) before pressurizing the charged reactor vessel with the inert gas and autogeneously pressurizing the reactor vessel to about 25 bar (at a temperature of 150 degrees Celsius). In some embodiments, after autogeneously pressurizing the reactor vessel, the method can include venting the reactor while heating the reactor vessel to a temperature of at about 150 degrees Celsius and maintaining the reactor vessel pressure from about 7 to about 10 bar. The method can also include, venting the pressurized reactor to about 1 bar while maintaining the reactor temperature at 150 degrees Celsius until substantially all of the ethanol is vented from the reactor and precipitated metals. In some embodiments, the method can include a step, after substantially venting all of the alcohol from the reactor and precipitated metals, of calcining the precipitated metals at about 950 degrees Celsius in oxidizing environment for about 5 hours to form the composition. In some embodiments, the method can include further calcining the composition at one of about 1000, about 1100, or 1200 degrees Celsius, respectively, for about 10 hours in oxidizing environment for testing and/or aging.

In accordance with some embodiments, the composition can contain wherein the one or more other rare earth oxides other than cerium oxide. In some embodiments, the composition can contain from about 5 to about 20 wt % of the one or more rare earth oxides other than cerium oxide.

In accordance with some embodiments, the one or more other rare earth oxides other than cerium oxide can be lanthanum oxide. In some embodiments, the composition can contain from about 1.5 to about 6 wt % lanthanum oxide.

In accordance with some embodiments, the composition can contain one or more other rare earth oxides other than cerium oxide or yttrium oxide. In some embodiments, the composition can contain from about 0.1 to about 30 wt % of the one or more other rare earth oxides other than cerium oxide or yttrium oxide. In some embodiments, the composition can contain from about 5 to about 20 wt % of the one or more other rare earth oxides other than cerium oxide or yttrium oxide. In some embodiments, the composition can contain from about 4 to about 9 wt % of the one or more other rare earth oxides other than cerium oxide or yttrium oxide.

In accordance with some embodiments, the composition can contain zirconium oxide. In some embodiments, the composition can contain from about 1 to about 99 wt % zirconium oxide. In some embodiments, the composition can contain from about 60 to about 85 wt % zirconium oxide.

In accordance with some embodiments, the composition can contain cerium oxide. In some embodiments, the composition can contain from about 1 to about 99 wt % cerium oxide. In some embodiments, the composition can contain from about 5 to about 30 wt % cerium oxide.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION OF FIGURES

The accompanying drawings, which are incorporated in and constitute a part of the specification, illustrate embodiments of the disclosure and together with the general description of the disclosure given above and the detailed description given below, serve to explain the principles of the disclosure.

Figure 2:
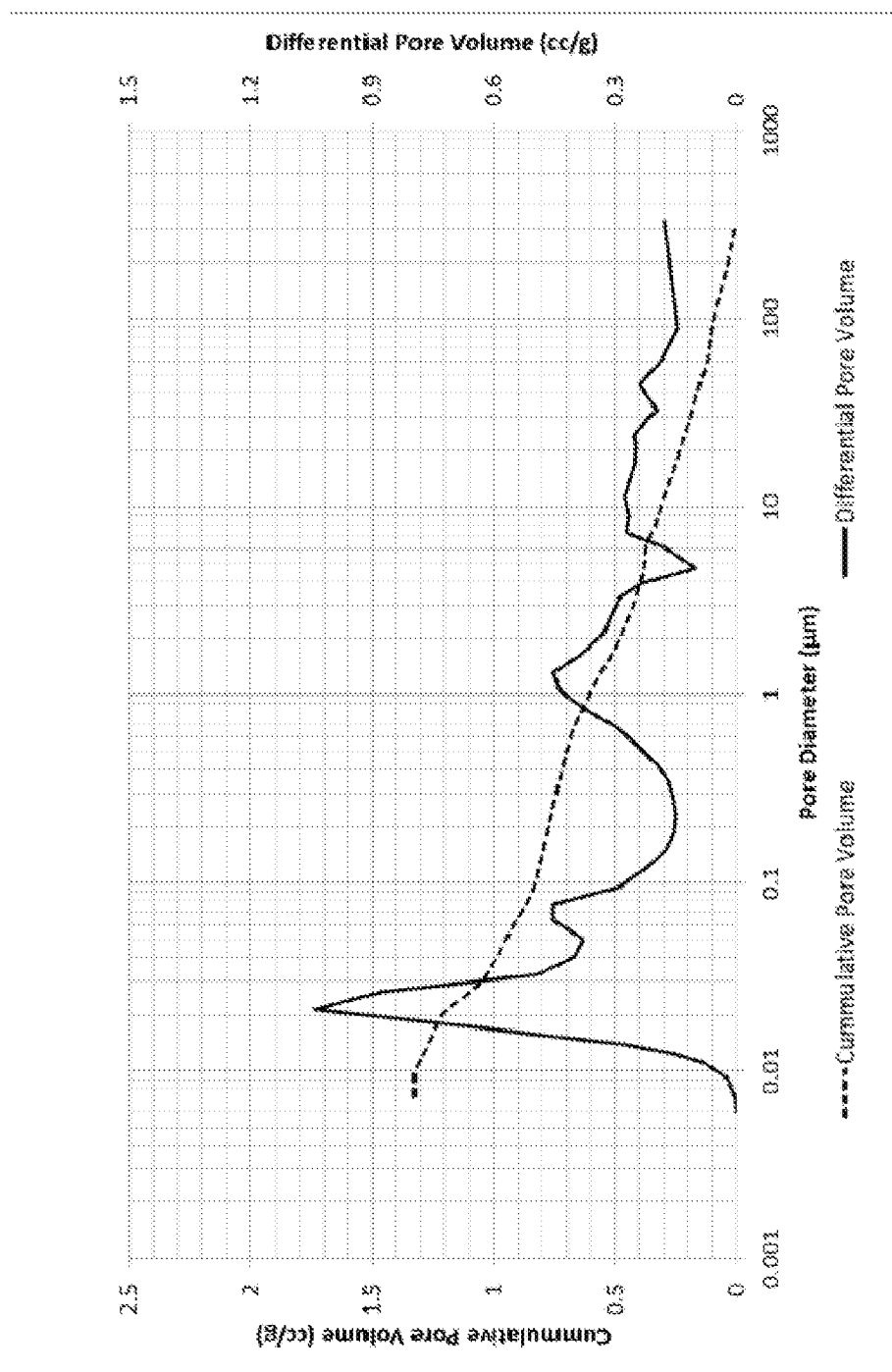

FIG. 1 shows the shows the $H_2$ thermal programmed reduction components for compositions according to some embodiments of the present disclosure; and FIG. 2 shows the cumulative and differential pore volume distribution according to some embodiments of present disclosure.

DETAILED DESCRIPTION

The present disclosure describes compositions that have properties that address the above mentioned needs. It is therefore the objective of the present disclosure to provide oxides based on cerium and zirconium that have large and thermally stable surface area, high and thermally stable porosity, large pore openings, high bulk oxygen mobility, that is reversibly reduced and oxidized and to provide a method for the synthesis of such oxides. According to the some embodiments of the disclosure the compositions can be in the form of particles that have a surface area that can be about 50 $m^2/g$ or more after calcination in an oxidizing environment at about 1000 degrees Celsius for about 10 hours. In some embodiments the particles can have a surface area of 24 $m^2/g$ or more after calcination at about 1100 degrees Celsius for about 10 hours in an oxidizing environment.

In accordance with some embodiments of the disclosure, the compositions can comprise oxides. The oxides can be in the form of particles. Moreover, the compositions can have a pore volume of about 1.33 cc/g or more. In some embodiments, the compositions can have a pore volume of about 0.65 cc/g or more after calcination at about 1100 degrees Celsius for about 10 hours in an oxidizing environment.

In accordance with some embodiments of the disclosure, the oxides can be in the form of particles. In some embodiments, the particles can have pore openings. In some embodiments, the pore openings can be from about 130 Å to about 1000 Å. In some embodiments, the pore openings can be from about 200 Å to about 2 μm after calcination at about 1100 degrees Celsius for about 10 hours in an oxidizing environment. Typically, the pore openings can have a bi-modal distribution. The first mode can have a median value from about 100 Å to about 1000 Å. The second mode can be rather wide and can have a median value from about 1.2 μm to about 2.5 μm. More typically, the pore openings can a have a median value from 200 Å to 1 μm after calcination at about 1100 degrees Celsius for about 10 hours in an oxidizing environment.

In accordance with some embodiments of the disclosure, the oxides can be in form particles that can contain cerium (IV) oxide. Moreover, the cerium (IV) oxide can have a consumption ratio of $H_2/CeO_2$ of at about 0.5 or more as measured by a Temperature Programmed Reduction (TPR).

In accordance with some embodiments of the disclosure, the oxides can be in form particles that can have a ($H_2$) thermal programmed reduction component at a temperature of less than about 400 degrees Celsius. Moreover, the oxides can have a hydrogen ($H_2$) thermal program reduction component value at a temperature greater than about 400 degrees Celsius.

In accordance with some embodiments of the disclosure is a process for making the composition. Typically, the composition can comprise two or more metal oxides. The process can include a step of obtaining a precipitate by combining the water soluble salts the two or more metals with a base under moderate agitation. The water soluble salts the two or more metals can be any form of the two or more metal salts. Typically, each of the two or more metal salts has a water solubility of more than about 2 g/L. More typically, each of the two or more metal salts have a water solubility of more than about 5 g/L, or even more typically a water solubility of more than about 10 g/L. Even more, typically two or more metal salts comprise nitrates. The process can include a step of washing the obtained precipitate. Furthermore, the process can include a step of dispersing the precipitate in an alcoholic solution to form an alcoholic dispersion. In some embodiments, the process can include charging the alcoholic dispersion to a reactor. Moreover, the process can include a step of raising one or both of the temperature and pressure of the alcoholic dispersion contained within the reactor. Typically, the alcoholic dispersion is raised to a temperature of about 150° C. or more and raised to pressure of about 1 bar or more. Some embodiments of the process include a step of reducing the pressure to atmospheric pressure whilst maintaining the temperature. Some embodiments of the process can include a step of reducing the temperature. Moreover, the process can include a step of recovering a fresh composition. In some embodiments, the process can include a step of calcining the fresh composition. Typically, the fresh composition can be calcined at a temperature of about 300 degrees Celsius or more. More typically, the fresh composition can be calcined at a temperatures of about 300 degrees Celsius or more under one of an oxidizing atmosphere, a reducing atmosphere, an inert atmosphere, or a successive combination of these atmospheres.

The nature and objects of the disclosure are further illustrated by the following example, which is provided for illustrative purposes only and not to limit the disclosure as defined by the claims. The following examples are provided to illustrate certain aspects, embodiments, and configurations of the disclosure and are not to be construed as limitations on the disclosure, as set forth in the appended claims. All parts and percentages are by weight unless otherwise specified.

Example 1: 60 wt % $ZrO_2$; 30 wt % $CeO_2$; 6 wt % $La_2O_3$; 4 wt % $Y_2O_3$

A mixed oxide with the composition of oxide equivalent to about 60 wt % $ZrO_2$, about 30 wt % $CeO_2$, about 6 wt % $La_2O_3$, and about 4 wt % $Y_2O_3$ was synthesized by the following method. Solutions of zirconyl nitrate, cerium (III) nitrate, lanthanum nitrate and yttrium nitrate were combined in appropriate ratios to achieve the targeted elemental compositions of zirconium, cerium, lanthanum and yttrium. Distilled deionized water was then added to achieve a total oxide-based relative concentration of the metals of about 100 grams/liter. Following this adjustment, about 10 ml of hydrogen peroxide ($H_2O_2$, about 32 wt %) was added to the solution. This solution was then added slowly to a continuously stirred solution of ammonia water (about 1000 ml of about 4.5 molar $NH_4OH$). The reaction temperature was kept at about 25 degrees Celsius. The resultant precipitate was then filtered and thoroughly washed with distilled de-ionized water at 55 degrees Celsius. The filtered solids were then washed with about 1200 ml of ethanol (about 99%). Following this last step, the solids were filtered and dispersed in ethanol (about 99%) to a total volume of about 675 ml in a stirred Parr reactor model number 4530. The reactor containing the resultant slurry was then fully purged with argon. Following this purge step, the reactor was pressurized with argon to about 10 bar. Subsequently, the reactor was heated until the autogeneously generated pressure reached about 25 bar (at a temperature of about 150 degrees Celsius) at which time, the reactor pressure was lowered by venting and was maintained from about 7 to about 10 bar by venting whilst heating continued to a temperature of about 150 degrees Celsius. At that time, the reactor pressure was lowered by venting to about 1 bar and heating was maintained at a temperature of about 150 degrees Celsius until all the ethanol was substantially eliminated from the material and reactor. The reactor was then cooled to room temperature and the resultant powder material was calcined at about 950 degrees Celsius in air for about 5 hours. The resultant material is defined as material in the fresh state. The fresh material was then further calcined at one of about 1000, about 1100, or about 1200 degrees Celsius, respectively (see Table) for 10 hrs in air for testing (defined as the aging conditions).

Example 2: 60 wt % $ZrO_2$; 30 wt % $CeO_2$; 6 wt % $La_2O_3$; 4 wt % $Y_2O_3$

A mixed oxide with the composition of oxide equivalent of about 60 wt % $ZrO_2$, about 30 wt % $CeO_2$, about 6 wt % $La_2O_3$, and about 4 wt % $Y_2O_3$ was synthesized by the following method. Solutions of zirconyl nitrate, cerium(III) nitrate, lanthanum nitrate and yttrium nitrate were combined in appropriate ratios to achieve the targeted elemental compositions of zirconium, cerium, lanthanum and yttrium. Distilled deionized water was then added to achieve a total oxide-based relative concentration of the metals of about 100 grams/liter. Following this adjustment, about 10 ml of hydrogen peroxide ($H_2O_2$, about 32 wt %) was added to the solution. This solution was then added slowly to a continuously stirred solution of ammonia water (about 1000 ml of about 4.5 molar $NH_4OH$). The reaction temperature was kept at about 25 degrees Celsius. The resultant precipitate was then filtered and thoroughly washed with distilled de-ionized water at about 55 degrees Celsius. The filtered solids were then washed with about 1200 ml of ethanol (about 99%). Following this last step, the solids were filtered and dispersed in ethanol (about 99%) to a total volume of about 675 ml in a stirred Parr reactor model number 4530. The reactor containing the resultant slurry was then fully purged with argon. Following this purge step, the reactor was pressurized with argon to about 10 bar. Subsequently, the reactor was heated until the autogeneously generated pressure reached a maximum pressure of about 30 bar (at about 180 degrees Celsius), more specifically at a pressure of about 20 to about 25 bar (at about 180 degrees Celsius) at which time, the reactor pressure was lowered by venting and was maintained at a pressure of about 17 to about 25 bar whilst heating continued to maintain a temperature of about 180 degrees C. At that time, the reactor was vented to 1 bar and heating continued and was maintained at a temperature of 180 degrees Celsius until all the ethanol was substantially eliminated from the material and reactor. The reactor was then cooled to room temperature and the resultant powder material was calcined at about 950 degrees Celsius in air for about 5 hours. The resultant material is defined as material in the fresh state. The fresh material was then further calcined at one of about 1000, about 1100, and about 1200 degrees Celsius, respectively for about 10 hours in air, see Table, for testing (defined as the aging conditions).

Example 3: 60 wt % $ZrO_2$; 30 wt % $CeO_2$; 6 wt % $La_2O_3$; 4 wt % $Y_2O_3$

A mixed oxide with the composition of oxide equivalent of about 60 wt % $ZrO_2$, about 30 wt % $CeO_2$, about 6 wt % $La_2O_3$, and about 4 wt % $Y_2O_3$ was synthesized by the following method. Solutions of zirconyl nitrate, cerium(III) nitrate, lanthanum nitrate and yttrium nitrate were combined in appropriate ratios to achieve the targeted elemental compositions of zirconium, cerium, lanthanum and yttrium. Distilled deionized water was then added to achieve a total oxide-based relative concentration of the metals of about 100 grams/liter. Following this adjustment, about 10 ml of hydrogen peroxide ($H_2O_2$, about 32 wt %) was added to the solution. This solution was then added slowly to a continuously stirred solution of ammonia water (about 1000 ml of about 4.5 molar $NH_4O_4$). The reaction temperature was kept at about 25 degrees Celsius. The resultant precipitate was then filtered and thoroughly washed with distilled de-ionized water at about 55 degrees Celsius. The filtered solids were then washed with about 1200 ml of ethanol (about 99%). Following this last step, the solids were filtered and dispersed in ethanol (about 99%) to a total volume of about 675 ml in a stirred Parr reactor model number 4530. The reactor containing the resultant slurry was then fully purged with argon. Following this purge step, the reactor was pressurized with argon to about 10 bar. Subsequently, the reactor was heated until the autogeneously generated pressure reached about a maximum pressure of about 50 bar (at about 200 degrees Celsius), more specifically at pressure from about 40 to about 50 bar (at about 200 degrees Celsius at which time the reactor pressure was lowered by venting and was maintained at a pressure from about 25 to about 35 bar by venting whilst heating continued at a temperature of about 200 degrees Celsius. At that time, the reactor was vented to about 1 bar and heating continued and the temperature was maintained at about 200 degrees Celsius until all the ethanol was substantially eliminated from the material and reactor. The reactor was then cooled to room temperature and the resultant powder material was calcined at about 950 degrees Celsius in air for about 5 hours. The resultant material is defined as material in the fresh state. The fresh material was then further calcined at one of about 1000, about 1100, and about 1200 degrees Celsius, respectively, for about 10 hours (see Table) in air for testing (defined as the aging conditions).

Example 4: 72.2 wt % $ZrO_2$; 20.8 wt % $CeO_2$; 1.7 wt % $La_2O_3$; 5.3 wt % $Nd_2O_3$ A mixed oxide with the composition of oxide equivalent of about 72.2 wt % $ZrO_2$, about 20.8 wt % $CeO_2$, about 1.7 wt % $La_2O_3$, and about 5.3 wt % $Nd_2O_3$ was synthesized by the following method. Solutions of zirconyl nitrate, cerium (III) nitrate, lanthanum nitrate and yttrium nitrate were combined in appropriate ratios to achieve the targeted elemental compositions of zirconium, cerium, lanthanum and neodymium. Distilled deionized water was then added to achieve a total oxide-based relative concentration of the metals of about 100 grams/liter. Following this adjustment, about 7 ml of hydrogen peroxide ($H_2O_2$, about 32 wt %) was added to the solution. This solution was then added slowly to a continuously stirred solution of ammonia water (about 1000 ml of about 4.5 molar $NH_4OH$). The reaction temperature was kept at a temperature of about 25 degrees Celsius. The resultant precipitate was then filtered and thoroughly washed with distilled de-ionized water at a temperature of about 55 degrees Celsius. The filtered solids were then washed with about 1200 ml of ethanol (about 99%). Following this last step, the solids were filtered and dispersed in ethanol (about 99%) to a total volume of about 675 ml in a stirred Parr reactor model number 4530. The reactor containing the resultant slurry was then fully purged with argon. Following this purge step, the reactor was pressurized with argon to about 10 bar. Subsequently, the reactor was heated until the autogeneously generated pressure reached about 140 bar at which time, the reactor pressure was maintained at a pressure from about 130 to about 140 bar by venting whilst heating continued to a temperature of about 300 degrees Celsius. At that time, the reactor was vented to about 1 bar and heating continued until all the ethanol was eliminated from the material and reactor. The reactor was then cooled to room temperature and the resultant powder material was calcined at a temperature of about 950 degrees Celsius in air for about 5 hours. The resultant material is defined as material in the fresh state. The fresh material was then further calcined at one of about 1000, about 1100, and about 1200 degrees Celsius, respectively, for about 10 hrs in air (see Table) for testing (defined as the aging conditions).

Example 5: 60 wt % $ZrO_2$; 30 wt % $CeO_2$; 6 wt % $La_2O_3$; 4 wt % $Y_2O_3$

A mixed oxide with the composition of oxide equivalent of about 60 wt % $ZrO_2$, 30 wt % $CeO_2$, 6 wt % $La_2O_3$, and about 4 wt % $Y_2O_3$ was synthesized by the same method as described in Example 4. The evaluation results are given in the Table.

Example 6: 84 wt % $ZrO_2$; 5 wt % $CeO_2$; 2.5 wt % $La_2O_3$; 8.5 wt % $Nd_2O_3$ A mixed oxide with the composition of oxide equivalent of about 84 wt % $ZrO_2$, about 5 wt % $CeO_2$, about 2.5 wt % $La_2O_3$, and about 8.5 wt % $Nd_2O_3$ was synthesized by the same method as described in Example 4. The evaluation results are given in the Table.

Example 7: 40 wt % $ZrO_2$; 50 wt % $CeO_2$; 5 wt % $La_2O_3$; 5 wt % $Y_2O_3$

A mixed oxide with the composition of oxide equivalent of about 40% $ZrO_2$, about 50 wt % $CeO_2$, about 5 wt % $La_2O_3$, and about 5 wt % $Y_2O_3$ was synthesized by the same method as described in Example 4. The evaluation results are given in the Table.

Example 8: 60 wt % $ZrO_2$; 30 wt % $CeO_2$; 6 wt % $La_2O_3$; 4 wt % $Y_2O_3$

A mixed oxide with the composition of oxide equivalent of about 60 wt % $ZrO_2$, about 30 wt % $CeO_2$, about 6 wt % $La_2O_3$, and about 4 wt % $Y_2O_3$ was synthesized by the following method. Solutions of zirconyl nitrate, cerium(III) nitrate, lanthanum nitrate and yttrium nitrate were combined in appropriate ratios to achieve the targeted elemental compositions of zirconium, cerium, lanthanum and yttrium. Distilled deionized water was then added to achieve a total oxide-based relative concentration of the metals of about 100 grams/liter. Following this adjustment, about 10 ml of hydrogen peroxide ($H_2O_2$, about 32 wt %) was added to the solution. This solution was then added slowly to a continuously stirred solution of ammonia water (about 1000 ml of about 4.5 molar $NH_4OH$). The reaction temperature was kept at a temperature of about 25 degrees Celsius. The resultant precipitate was then filtered and thoroughly washed with distilled de-ionized water at a temperature of about 55 degrees Celsius. The filtered solids were then washed with about 1200 ml of ethanol (about 70%). Following this last step, the solids were filtered and dispersed in ethanol (about 70%) to a total volume of about 675 ml in a stirred Parr reactor model number 4530. The reactor containing the resultant slurry was then fully purged with argon. Following this purge step, the reactor was pressurized with argon to a pressure of about 10 bar. Subsequently, the reactor was heated until the autogeneously generated pressure reached about 140 bar at which time, the reactor pressure was maintained at am autogeneously pressure from 130 to about 140 bar by venting whilst heating continued to a temperature of about 300 degrees Celsius. At that time, the reactor was vented to about 1 bar and heating continued until all the ethanol was substantially eliminated from the material and reactor. The reactor was then cooled to room temperature and the resultant powder material was calcined at about 950 degrees Celsius in air for about 5 hours. The resultant material is defined as material in the fresh state. The fresh material was then further calcined at one of about 1000, 1100, and about 1200 degrees Celsius, respectively, for about 10 hrs in air (see Table) for testing (defined as the aging conditions).

Example 9: 60 wt % $ZrO_2$; 30 wt % $CeO_2$; 6 wt % $La_2O_3$; 4 wt % $Y_2O_3$

A mixed oxide with the composition of oxide equivalent of about 60 wt % $ZrO_2$, about 30 wt % $CeO_2$, about 6 wt % $La_2O_3$, and about 4 wt % $Y_2O_3$ was synthesized by the following method. Solutions of zirconyl nitrate, cerium(III) nitrate, lanthanum nitrate and yttrium nitrate were combined in appropriate ratios to achieve the targeted elemental compositions of zirconium, cerium, lanthanum and yttrium.

Distilled deionized water was then added to achieve a total oxide-based relative concentration of the metals of about 100 grams/liter. Following this adjustment, about 10 ml of hydrogen peroxide ($H_2O_2$, about 32 wt %) was added to the solution. This solution was then added slowly to a continuously stirred solution of ammonia water (about 1000 ml of about 4.5 molar $NH_4OH$). The reaction temperature was kept at a temperature of about 25 degrees Celsius. The resultant precipitate was then filtered and thoroughly washed with distilled de-ionized water at a temperature of about 55 degrees Celsius. The filtered solids were then washed with about 1200 ml of isopropanol (about 99%). Following this last step, the solids were filtered and dispersed in isopropanol (about 99%) to a total volume of about 675 ml in a stirred Parr reactor model number 4530. The reactor containing the resultant slurry was then fully purged with argon. Following this purge step, the reactor was pressurized with argon to about 10 bar. Subsequently, the reactor was heated until the autogeneously generated pressure reached about 140 bar at which time, the reactor pressure was maintained at about 130 to about 140 bar by venting whilst heating continued to a temperature of about 300 degrees Celsius. At that time, the reactor was vented to about 1 bar and heating continued until substantially all of the isopropanol was eliminated from the material and reactor. The reactor was then cooled to room temperature and the resultant powder material was calcined at about 950 degrees Celsius in air for about 5 hours. The resultant material is defined as material in the fresh state. The fresh material was then further calcined at one of about 1000, about 1100, and about 1200 degrees Celsius, respectively, for about 10 hrs in air (see Table) for testing (defined as the aging conditions).

Example 10: 60 wt % $ZrO_2$; 30 wt % $CeO_2$: 6 wt % $La_2O_3$: 4 wt % $Y_2O_3$

A mixed oxide with the composition of oxide equivalent of about 60 wt % $ZrO_2$, about 30 wt % $CeO_2$, about 6 wt % $La_2O_3$, and about 4 wt % $Y_2O_3$ was synthesized by the following method. Solutions of zirconyl nitrate, ceric ammonium nitrate, lanthanum nitrate and yttrium nitrate were combined in appropriate ratios to achieve the targeted elemental compositions of zirconium, cerium, lanthanum and neodymium. Distilled deionized water was then added to achieve a total oxide-based relative concentration of the metals of about 100 grams/liter. This solution was then added slowly to a continuously stirred solution of ammonia water (about 1000 ml of about 4.5 molar $NH_4OH$). The reaction temperature was kept at a temperature of about 25 degrees Celsius. The resultant precipitate was then filtered and thoroughly washed with distilled de-ionized water at a temperature of about 55 degrees Celsius. The filtered solids were then washed with about 1200 ml of ethanol (about 99%). Following this last step, the solids were filtered and dispersed in ethanol (about 99%) to a total volume of about 675 ml in a stirred Parr reactor model number 4530. The reactor containing the resultant slurry was then fully purged with argon. Following this purge step, the reactor was pressurized with argon to about 10 bar. Subsequently, the reactor was heated until the autogeneously generated pressure reached about 140 bar at which time, the reactor pressure was maintained at a pressure from about 130 to about 140 bar by venting whilst heating continued to a temperature of about 300 degrees Celsius. At that time, the reactor was vented to about 1 bar and heating continued until all the ethanol was eliminated from the material and reactor. The reactor was then cooled to room temperature and the resultant powder material was calcined at a temperature of about 950 degrees Celsius in air for about 5 hours. The fresh material was then further calcined at one of about 1000, about 1100, and about 1200 degrees Celsius, respectively, for about 10 hrs in air (see Table) for testing (defined as the aging conditions). FIG. 1 shows the $H_2$ thermal programmed reduction components over a temperature range from about 100 to about 1100 degrees Celsius; two components are evident between 300 and 500 degrees Celsius, with one component at a temperature of 400 degrees Celsius or less and another at a temperature of more than 400 degrees Celsius.

The porosity and total pore volume was measured using a Micromeritics Autopore IV 9500system. The procedures outlined in ASTM International test method D 4284-07 were followed; the sample size was 0.5 grams, the mercury contact angle was 130°, the mercury surface tension was 0.485 N/m (4845 d/cm). The optimal pressure increase was a step-wise increase with a dwell time of 10 seconds/step. Additional details are given below. A graphical example of the cumulative pore volume distribution of the Example 1 resultant fresh material is shown in the FIG. 2, which shows the cumulative and differential pore volume distribution for the fresh material of Example 1.

The apparent surface area of the material was determined by using a Micromeritics ASAP 2000 system and nitrogen at about 77 about Kelvin. The procedure outlined in ASTM International test method D 3663-03 (Reapproved 2008) was used but with one significant exception. It is well known that a "BET Surface Area" determination is not possible for materials that contain microporosity. Recognizing that the surface area is an approximation, the values reported are labeled "apparent surface area" values rather than "BET surface area" values. In compliance with commonly accepted procedures, the determination of apparent surface area, the application of the BET equation was limited to the pressure range where the term $n_a(1-P/Po)$ of the equation continuously increases with P/Po. The out gassing of the sample was done under nitrogen at about 300 degrees Celsius for about 2 hours.

The reducibility of each of the samples was done using an Altamira Instruments AMI-390 Temperature Programmed Reduction (TPR) apparatus using air as the oxidant gas and hydrogen as the reducing gas. The system was calibrated using 1% Re on 1% $Co_3O_4$ on alumina as a baseline material. The measurement procedure used was as

TABLE

| Example | Total Pore Volume (cc/g) | | Hydrogen TPR signal integral area (100°-1000° C.) | | Apparent Surface Area (m²/g) after Calcination for 10 hours | | |
|---|---|---|---|---|---|---|---|
| | Fresh | 1100° C./ 10 hrs | H₂ Consumption Integral (μmol/g) | H₂ Consumption/ CeO₂ Molar Ratio | 1000° C. | 1100° C. | 1200° C. |
| 1 | 1.33 | 0.65 | 1022 | 0.59 | 54 | 24 | 1.9 |
| 2 | 1.43 | 0.71 | 966 | 0.55 | 53 | 27 | 2.4 |
| 3 | 1.67 | 0.85 | 967 | 0.55 | 55 | 27 | 2.9 |
| 4 | 1.96 | 0.99 | 654 | 0.54 | 54 | 28 | 3.9 |
| 5 | 2.00 | 1.58 | 950 | 0.55 | 58 | 28 | 4 |
| 6 | 2.20 | 1.11 | 287 | 0.99 | 54 | 29 | 4.6 |
| 7 | 2.33 | 1.07 | 1163 | 0.67 | 55 | 26 | 3.6 |
| 8 | 2.60 | 1.17 | | | 63 | 28 | 4.1 |
| 9 | 3.23 | 1.46 | 1006 | 0.58 | 60 | 27 | 4.5 |
| 10 | | 1.19 | 934 | 0.54 | 58 | 28 | 5.2 | follows. At first a 0.05 gram of 1000 degrees Celsius of an aged sample was placed into the TPR machine sample tube. The sample tube was then connected to the apparatus and the sample was pre-oxidized at 400° C. in 25 cc/minute flowing $O_2$/He (10:90 vol %) atmosphere for 15 min. Following this treatment, the sample was allowed to cool under the same gas flow. Once cooled to about 100° C., the flow of gas was changed to a $H_2$/Ar mixture (5:95 vol %) with a flow rate of 25 cc/minute. The temperature was then ramped at 10° C./minute to 1000° C. whilst simultaneously monitoring the system output with TCD detectors. The total consumption of $H_2$ relative to the $CeO_2$ molar equivalent content in the sample is calculated.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, sub-combinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A composition comprising zirconium oxide, cerium oxide and optionally one or more other rare earth oxides other than cerium oxide, wherein the composition has a hydrogen thermal program reduction uptake after calcination at 1000 degrees Celsius for 10 hours of from about 0.5 to about 1.1 molar ratio of $H_2$ consumption/$CeO_2$, and wherein one or more of the following are true:
    (i) wherein the composition has a total pore volume of about 0.7 to about 3.5 cc/g; and
    (ii) wherein the composition has one or more of a BET and apparent surface area selected from the group consisting of from about 1.0 to about 6.0 m²/g after calcinations at 1200 degrees Celsius for a period of 10 hours or more in an oxidizing environment, from about 20 m²/g to about 30 m²/g after calcination at 1100 degrees Celsius for a period of 10 hours in an oxidizing environment, from about 45 m²/g to about 70 m²/g after calcination at 1000 degrees Celsius for a period of 10 hours in an oxidizing environment, and combinations thereof.

2. The composition of claim 1, wherein (i) is true.

3. The composition of claim 2, wherein the total pore volume is about 0.7 cc/g, and wherein the hydrogen thermal program reduction uptake after calcination at 1000 degrees Celsius for 10 hours is about 0.5 molar ratio of $H_2$ consumption/$CeO_2$.

4. The composition of claim 2, wherein the total pore volume is about 3.20 cc/g, and wherein the hydrogen thermal program reduction uptake after calcination at 1000 degrees Celsius for a period of 10 hours in an oxidizing environment is about 0.99 molar ratio of $H_2$ consumption/$CeO_2$.

5. The composition of claim 2, wherein the total pore volume is about 0.7 cc/g, and wherein the hydrogen thermal program reduction uptake after calcination at 1000 degrees Celsius for a period of 10 hours in an oxidizing environment is about 0.99 molar ratio of $H_2$ consumption/$CeO_2$.

6. The composition of claim 2, wherein the total pore volume is about 3.20 cc/g, and wherein the hydrogen thermal program reduction uptake after calcination at 1000 degrees Celsius for 10 hours is about 0.5 molar ratio of $H_2$ consumption/$CeO_2$.

7. The composition of claim 1, wherein (i) and (iii) are true.

8. The composition of claim 7, wherein the total pore volume is about 0.7 cc/g, and wherein the one or more of a BET and apparent surface area is about 20 $m^2$/g after calcination at 1100 degrees Celsius for a period of 10 hours in an oxidizing environment.

9. The composition of claim 7, wherein the total pore volume is about 3.20 cc/g, and wherein the one or more of a BET and apparent surface area is about 30 $m^2$/g after calcination at 1100 degrees Celsius for a period of 10 hours in an oxidizing environment.

10. The composition of claim 7, wherein the total pore volume is about 0.7 cc/g, and wherein the one or more of a BET and apparent surface area is about 45 $m^2$/g after calcination at 1000 degrees Celsius for a period of 10 hours in an oxidizing environment.

11. The composition of claim 7, wherein the total pore volume is about 3.20 cc/g, and wherein the one or more of a BET and apparent surface area is about 70 $m^2$/g after calcination at 1000 degrees Celsius for a period of 10 hours in an oxidizing environment.

12. The composition of claim 1, wherein (ii) is true.

13. The composition of claim 12, wherein the hydrogen thermal program reduction uptake after calcination at 1000 degrees Celsius for 10 hours is about 0.5 molar ratio of $H_2$ consumption/$CeO_2$, and wherein the one or more of a BET and apparent surface area is about 20 $m^2$/g after calcination at 1100 degrees Celsius for a period of 10 hours in an oxidizing environment.

14. The composition of claim 12, wherein the hydrogen thermal program reduction uptake after calcination at 1000 degrees Celsius for a period of 10 hours in an oxidizing environment is about 0.99 molar ratio of $H_2$ consumption/$CeO_2$, and wherein the one or more of a BET and apparent surface area is about 30 $m^2$/g after calcination at 1100 degrees Celsius for a period of 10 hours in an oxidizing environment.

15. The composition of claim 12, wherein the hydrogen thermal program reduction uptake after calcination at 1000 degrees Celsius for a period of 10 hours in an oxidizing environment is about 0.99 molar ratio of $H_2$ consumption/$CeO_2$, and wherein the one or more of a BET and apparent surface area is about 45 $m^2$/g after calcination at 1000 degrees Celsius for a period of 10 hours in an oxidizing environment.

16. The composition of claim 12, wherein the hydrogen thermal program reduction uptake after calcination at 1000 degrees Celsius for 10 hours is about 0.5 molar ratio of $H_2$ consumption/$CeO_2$, and wherein the one or more of a BET and apparent surface area is about 70 $m^2$/g after calcination at 1000 degrees Celsius for a period of 10 hours in an oxidizing environment.

17. The composition of claim 1, wherein the zirconium oxide comprises from about 1 to about 99 wt % of the composition, wherein the cerium oxide comprises from about 1 to about 99 wt % of composition, and wherein the one or more rare earth oxides other than cerium oxide comprise from about 0.1 to about 30 wt % of the composition.

18. The composition of claim 1, wherein the zirconium oxide comprises from about 60 wt % to about 85 wt % of the composition, wherein the cerium oxide comprises from about 5 wt % to about 30 wt % of the composition.

19. The composition of claim 1, wherein the composition comprises from about 5 wt % to about 20 wt % of the one or more rare earth oxides other than cerium oxide.

20. The composition of claim 1, wherein the composition comprises from about 1.5 wt % to about 6 wt % lanthanum oxide.

21. A composition comprising zirconium oxide, cerium oxide and optionally one or more other rare earth oxides other than cerium oxide, wherein the composition has a hydrogen thermal program reduction uptake after calcination at 1000 degrees Celsius for 10 hours of from about 0.54 to about 0.99 molar ratio of $H_2$ consumption/$CeO_2$, and wherein one or more of the following are true:
  (i) wherein the composition has a total pore volume of about 0.65 to about 3.20 cc/g; and
  (ii) wherein the composition has one or more of a BET and apparent surface area selected from the group consisting of from about 1.9 to about 5.2 $m^2$/g after calcinations at 1200 degrees Celsius for a period of 10 hours or more in an oxidizing environment, from about 24 $m^2$/g to about 29 $m^2$/g after calcination at 1100 degrees Celsius for a period of 10 hours in an oxidizing environment, from about 50 $m^2$/g to about 65 $m^2$/g after calcination at 1000 degrees Celsius for a period of 10 hours in an oxidizing environment, and combinations thereof.

22. The composition of claim 21, wherein (i) is true.

23. The composition of claim 21, wherein (ii) is true.

24. The composition of claim 21, wherein (i) and (ii) are true.

25. The composition of claim 21, wherein the zirconium oxide comprises from about 1 to about 99 wt % of the composition, wherein the cerium oxide comprises from about 1 to about 99 wt % of composition, and wherein the one or more rare earth oxides other than cerium oxide comprise from about 0.1 to about 30 wt % of the composition.

26. The composition of claim 21, wherein the zirconium oxide comprises from about 60 wt % to about 85 wt % of the composition, wherein the cerium oxide comprises from about 5 wt % to about 30 wt % of the composition.

27. The composition of claim 21, wherein the composition comprises from about 5 wt % to about 20 wt % of the one or more rare earth oxides other than cerium oxide.

28. The composition of claim 21, wherein the composition comprises from about 1.5 wt % to about 6 wt % lanthanum oxide.

29. A composition comprising zirconium oxide, cerium oxide and optionally one or more other rare earth oxides other than cerium oxide, wherein the zirconium oxide comprises from about 60 wt % to about 85 wt % of the composition, wherein the cerium oxide comprises from about 5 wt % to about 30 wt % of the composition, wherein the one or more other rare earth oxides other than the cerium oxide or yttrium comprise from about 0.1 to about 30 wt % of the composition, wherein the composition has a hydrogen thermal program reduction uptake after calcination at 1000 degrees Celsius for 10 hours of about 0.5 to about 1.1 molar ratio of $H_2$ consumption/$CeO_2$, and wherein one or more of the following are true:
- (i) wherein the composition has a total pore volume of from about 0.7 to about 3.5 cc/g; and
- (ii) wherein the composition has one or more of a BET and apparent surface area selected from the group consisting of from about 1.0 to about 6.0 $m^2/g$ after calcinations at 1200 degrees Celsius for a period of 10 hours or more in an oxidizing environment, from about 20 $m^2/g$ to about 30 $m^2/g$ after calcination at 1100 degrees Celsius for a period of 10 hours in an oxidizing environment, from about 45 $m^2/g$ to about 70 $m^2/g$ after calcination at 1000 degrees Celsius for a period of 10 hours in an oxidizing environment, and combinations thereof.

30. The composition of claim 29, wherein (i) and (ii) are true.

* * * * *